(12) United States Patent
Alexander et al.

(10) Patent No.: US 10,668,850 B1
(45) Date of Patent: Jun. 2, 2020

(54) SYSTEMS, APPARATUSES AND METHODS USING SELF-LIMITING INFLATABLE ELEMENTS FOR CARGO RETENTION

(71) Applicants: GM GLOBAL TECHNOLOGY OPERATIONS LLC, Detroit, MI (US); THE REGENTS OF THE UNIVERSITY OF MICHIGAN, Ann Arbor, MI (US)

(72) Inventors: Paul W. Alexander, Ypsilanti, MI (US); Diann Brei, Milford, MI (US); Jonathan E. Luntz, Ann Arbor, MI (US); Jesse Velleu, Mamaroneck, NY (US)

(73) Assignees: GM GLOBAL TECHNOLOGY OPERATIONS LLC, Detroit, MI (US); THE REGENTS OF THE UNIVERSITY OF MICHIGAN, Ann Arbor, MI (US)

(*) Notice: Subject to any disclaimer, the term of this patent is extended or adjusted under 35 U.S.C. 154(b) by 0 days.

(21) Appl. No.: 16/275,377

(22) Filed: Feb. 14, 2019

(51) Int. Cl.
| | | |
|---|---|---|
| F16M 11/00 | (2006.01) |
| B60P 7/06 | (2006.01) |
| F16M 13/02 | (2006.01) |
| B60R 11/00 | (2006.01) |
| B60R 7/04 | (2006.01) |

(52) U.S. Cl.
CPC .............. B60P 7/065 (2013.01); B60R 7/04 (2013.01); B60R 11/00 (2013.01); F16M 13/02 (2013.01); B60R 2011/0092 (2013.01)

(58) Field of Classification Search
CPC ....... B25B 5/06; B25B 5/061; B23K 37/0435; B23K 37/0408
See application file for complete search history.

(56) References Cited

U.S. PATENT DOCUMENTS

| | | | |
|---|---|---|---|
| 7,396,005 B2* | 7/2008 | Berset | B25B 5/06 269/216 |
| 9,610,675 B2* | 4/2017 | Southwell | B23K 37/0435 |
| 9,636,753 B2* | 5/2017 | Anson | B23B 49/026 |

* cited by examiner

*Primary Examiner* — Amy J. Sterling
(74) *Attorney, Agent, or Firm* — Lorenz & Kopf LLP

(57) ABSTRACT

Systems, apparatuses and methods are provided for object restraint including a trench; a pneumatic bending actuator (PBA), the PBA and the trench configured on the surface for clamping of the object to the surface; a part of the PBA constrained in the trench and a part of the PBA left unconstrained by the trench; a primary actuation mechanism for constraining in the trench the constrained part of the PBA to remain flat at the surface for resting the object on the surface, and for leaving the unconstrained part of the PBA configured as the curved segment to exert a clamping force to the object on the surface; and a secondary constraint mechanism to retain the constrained part of the PBA in the trench to prevent a portion of the constrained part of the PBA from exerting an upward force counter to the clamping of the unconstrained part of the PBA.

20 Claims, 23 Drawing Sheets

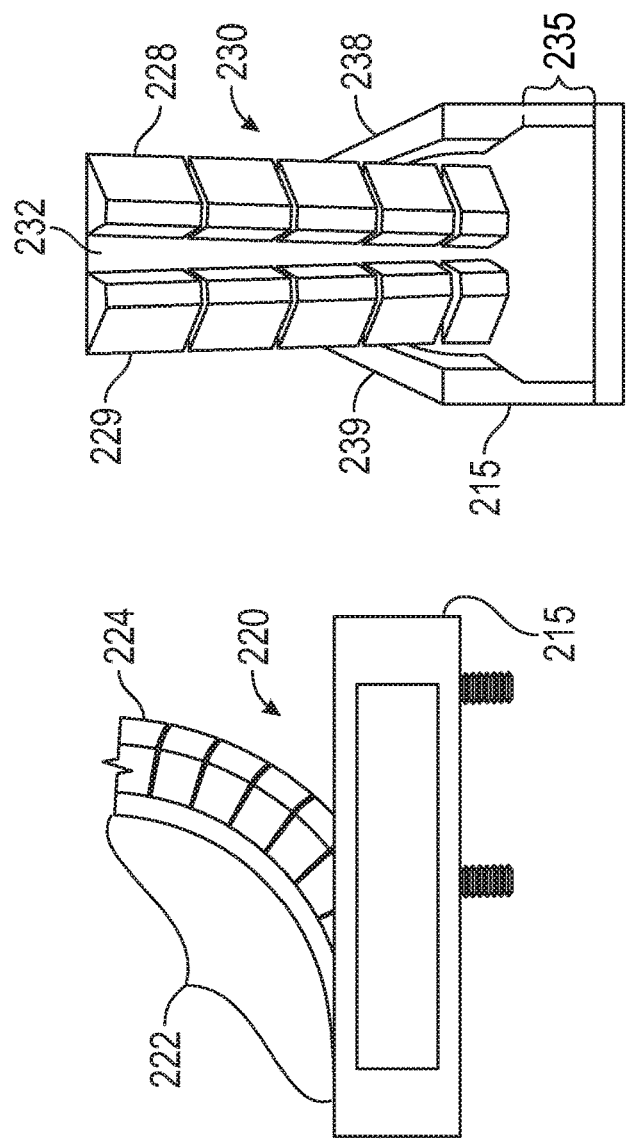
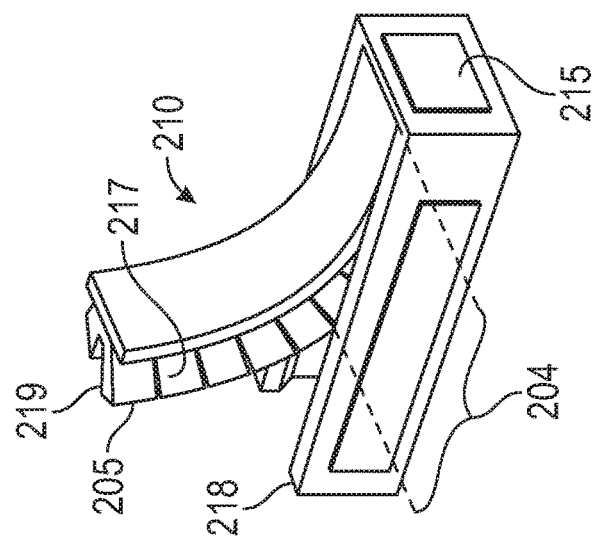
FIG. 2A

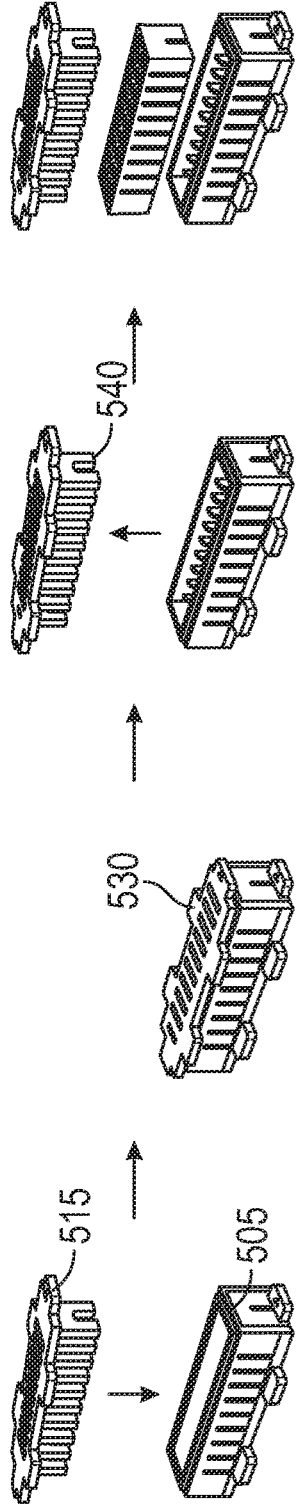
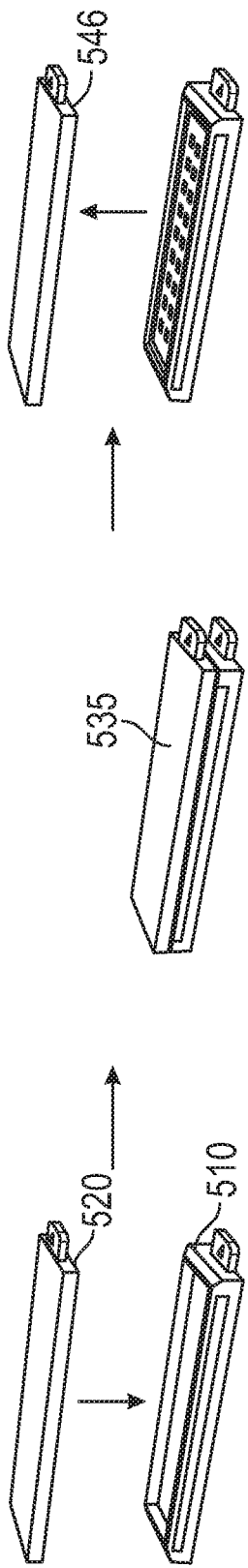
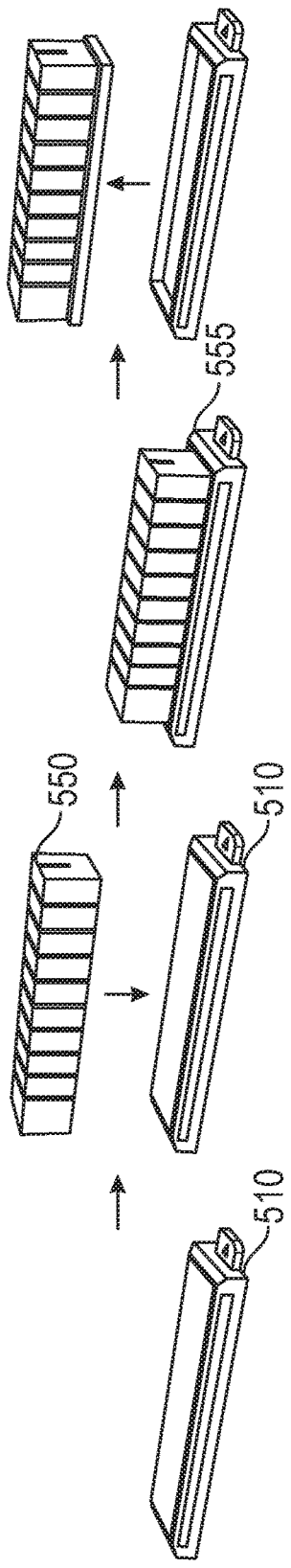
FIG. 5A
FIG. 5B
FIG. 5C

SYSTEMS, APPARATUSES AND METHODS USING SELF-LIMITING INFLATABLE ELEMENTS FOR CARGO RETENTION

CROSS REFERENCE TO RELATED APPLICATIONS

This application claims priority to U.S. Provisional Patent Application Ser. No. 62/650,857 entitled "SYSTEMS, APPARATUSES AND METHODS USING SELF-LIMITING INFLATABLE ELEMENTS FOR CARGO RETENTION", that was filed on 30 Mar. 2018, the entirety of which is incorporated by reference herein.

TECHNICAL FIELD

The technical field generally relates to cargo retention, and more particularly relates to an apparatuses, systems and methods with inflatable elements in an arrayed architecture for cargo retention in which the inflatable elements have self-limiting features which restrain or limit object motion by interfacing with objects of various shapes and sizes.

INTRODUCTION

Object restraint is a common place issue faced across all commercial and non-commercial vehicle types today. Passengers, drivers, and other occupants often want to mount devices such as smart phones, tablets, and navigation systems to dashboards and seatbacks. In addition, such persons also desire to prevent cargo in the vehicle from tipping or sliding in a trunk and/or other storage compartment within the interior during the course of vehicle movements. Often is the case, that current available attachments are heavy, clunky, and obtrusive type devices, or are otherwise undesirable. In addition, such current attachments often are not feasible as these attachments have difficult and intricate configurations for installation, may not integrate properly or directly into a vehicle, and may not be workable solutions as the attachments are usually object-specific. Additionally, there is currently lacking an availability of non-object specific options which are easily deployable object constraint systems for vehicles. The choice of inflatable devices for use as a solution is an attractive choice because inflatable devices when implemented can be lightweight, easily stowed, and have self-deployment capabilities.

Accordingly, it is desirable to provide an apparatus and system apparatus with inflatable features and arrayed and flare architectures for cargo retention which include inflatable elements than provide features which self-limit object motion to restrain objects in positions and orientations originally set by a user or operator.

Furthermore, other desirable features and characteristics of the present invention will become apparent from the subsequent detailed description and the appended claims, taken in conjunction with the accompanying drawings and the foregoing technical field and background.

SUMMARY

Systems, apparatuses and methods are provided for object restraints using arrayed inflatable features.

In one exemplary embodiment, an object restraint system for clamping an object to a surface is provided. An object restraint system for clamping an object to a surface includes: a trench; a pneumatic bending actuator (PBA), the PBA and the trench configured on the surface for enabling a clamping of the object to the surface; a part of the PBA constrained in the trench and a part of the PBA left unconstrained by the trench, wherein the constrained part is configured as flat on the surface and the unconstrained part is configured as a curved segment protruding from the surface wherein the part constrained is determined in part by a weight of the object clamped on the surface; a primary actuation mechanism for constraining in the trench the constrained part of the PBA to remain flat at the surface for resting the object on the surface, and for leaving the unconstrained part of the PBA configured as the curved segment to exert a clamping force to the object on the surface and for clamping the object to the surface; and a secondary constraint mechanism to retain the constrained part of the PBA in the trench to prevent a portion of the constrained part of the PBA from exerting an upward force counter to the clamping by the curved segment of the unconstrained part of the PBA on the object, and to ensure that an output force from the constrained part of the PBA is not enacted in a direction away from the surface.

In various exemplary embodiments, the constrained part includes: a range of the PBA from an insubstantial to a substantial part of the PBA, and the unconstrained part includes: a range of the PBA from an insubstantial to a substantial part of the PBA. The object restraint system, further includes: a set of chambers, each chamber including a cavity for compressing an amount of air wherein the amount of compressed air enables the cavity to exhibit a set of a plurality of output forces in both a perpendicular direction and a lateral direction from the cavity for enabling the constraint of the PBA. The object restraint system, further includes: an inextensible layer extends a side of the PBA and is attached to only one side of each chamber of the set of chambers to enable the compressed air to flow to each chamber and to constrain only the one side of each chamber in response to output forces from the compressed air in each chamber while an opposite side not attached to the inextensible layer is not constrained and is responsive to forces of the compressed air in the chamber. The constrained part of the PBA is constrained in the trench by the output forces in the lateral direction from each chamber of the PBA within the trench whereby the output forces of each chamber push against a side of the trench. The object restraint system, further includes: the curved segment of the unconstrained part of the PBA is configured by a set of lateral forces pushing against each side wall of each chamber and an expansion of each chamber in the opposite site not constrained thereby resulting in a curvature design of the curved segment by an expansion of only the single opposite side while the constrained side does not expand. The object restraint system, further includes: a retaining lip configured within the trench to constrain the constrained part of the PBA in the trench to remain flat at the surface wherein the surface of the trench is defined by the retaining lip. The object restraint system, further includes: a flare configuration for enabling further lateral expansion of each chamber of the PBA wherein the flare configuration is a split in the middle of each chamber to enable each side of the flare configuration to exert opposing forces for the lateral expansion. The object restraint system, further includes: the side of the flare configuration constrained in the perpendicular direction by the lip to enable the constrained part of the PBA to remain flat. The object restraint system, further includes: an array configured by a plurality of PBAs to a set of configurations of PBAs including: rotational, reflectional, double reflectional and localized symmetry of the each set for grip a variety of objects of different sizes.

In another exemplary embodiment, an apparatus for object restraint is provided. The apparatus includes: a trench; a pneumatic bending actuator (PBA), the PBA and the trench configured on a surface for enabling a clamping of the object to the surface; a part of the PBA constrained in the trench and a part of the PBA left unconstrained by the trench wherein the constrained part is configured as flat on the surface and the unconstrained is configured as a curved segment protruding from the surface wherein the constrained and unconstrained part include: a substantial to an unsubstantial part of the PBA; a primary actuation mechanism for constraining in the trench wherein the constrained part of the PBA remains flat at the surface for resting the object on the surface, and for leaving the unconstrained part configured as the curved segment to exert a clamping force to the object on the surface and for clamping the object to the surface; and a secondary constraint mechanism to constrain the constrained part of the PBA in the trench to prevent constrained portions of the constrained part of the PBA from exerting an upward force counter to the clamping by the curved segment of the unconstrained part of the PBA on the object, and to ensure that an output force from the constrained part of the PBA is not enacted in a direction away from the surface.

In various exemplary embodiments, the object restraint apparatus further includes: a set of chambers, each chamber including a cavity for compressing an amount of air wherein the amount of compressed air enables the cavity to exhibit a set of a plurality of output forces in both a perpendicular direction and a lateral direction from the cavity for enabling the constraint of the PBA. The object restraint apparatus, further includes: an inextensible layer extends a side of the PBA and is attached to only one side of each chamber of the set of chambers to enable the compressed air to flow to each chamber and to constrain only the one side of each chamber in response to output forces from the compressed air in each chamber while an opposite side not attached to the inextensible layer is not constrained and is responsive to forces of the compressed air in the chamber. The constrained part of the PBA is constrained in the trench by the output forces in the lateral direction from each chamber of the PBA within the trench whereby the output forces of each chamber push against a side of the trench. The object restraint apparatus, further includes: the curved segment of the unconstrained part of the PBA is configured by a set of lateral forces pushing against each side wall of each chamber and an expansion of each chamber in the opposite site not constrained thereby resulting in a curvature design of the curved segment by an expansion of only the single opposite side while the constrained side does not expand. The object restraint apparatus, further includes: a retaining lip configured within the trench to constrain the constrained part of the PBA in the trench to remain flat at the surface wherein the surface of the trench is defined by the retaining lip; and a flare configuration for enabling further lateral expansion of each chamber of the PBA wherein the flare configuration is a split in the middle of each chamber to enable each side of the flare configuration to exert opposing forces for the lateral expansion; wherein the side of the flare configuration constrained in the perpendicular direction by the lip to enable the constrained part of the PBA to remain flat; and an array configured by a plurality of PBAs to a set of configurations of PBAs including: rotational, reflectional, double reflectional and localized symmetry of the each set for grip a variety of objects of different sizes.

In yet another exemplary embodiment, a pneumatic pop-up actuator system is disclosed. The system includes: a plurality of pneumatic pop-up actuators to hold an object, each of the pneumatic pop-up actuators configured with a body and a side containing an internal cavity for storing compressed air wherein the body and side are responsive to forces of the compressed air in the cavity; the side of the pneumatic pop-up actuator configured to enable constraint in a trench in a non-popped state when not deployed, and to enable non-constraint from the trench in a popped state when deployed whereby during deployment the body of the pneumatic pop-up actuator extends from a surface and the side extends from the body in a manner both limited by the object and to hold the object on the surface; and an array including at least one pneumatic pop-up actuator deployed in a manner to surround the object on the surface and the pneumatic pop-up actuator not deployed when located in a manner beneath the object on the surface wherein the pneumatic pop-up actuator beneath the object is blocked from deployment by the object; and further constraint by weight of the object wherein the weight of the object act as an additional constraint by applying a downward force to the pneumatic pop-up actuator in the trench.

In various exemplary embodiments, the pneumatic pop-actuator system, further includes: the non-popped up state wherein the pneumatic pop-up actuator remains flush with the surface of the trench; and a lip configured in the trench to restrain, by the side, the pneumatic pop-up actuator in the non-popped up state in the trench. The pneumatic pop-actuator system, further includes: the pneumatic pop-up actuators configured in the array in a manner to hold or retain objects between a set of at least one pneumatic pop-up actuator positioned at an array location wherein the pneumatic pop-up actuator holds or retains the object by being placed in the popped-up state. The pneumatic pop-up actuator system, further includes: the array of pneumatic pop-up actuators that hold or retain an object by at least one pop-up pneumatic actuator whilst the object resides over the surface containing at least one pneumatic pop-up actuator in a non-popped state thereby the array can accommodate objects of a variety of sizes and shapes that do not conform directly to a layout of the pneumatic pop-up actuators contained in the array.

It is noted that in various embodiments, the method contains steps which correspond to the functions of one or more of the various embodiments of the object constraint system described above.

BRIEF DESCRIPTION OF THE DRAWINGS

The exemplary embodiments will hereinafter be described in conjunction with the following drawing figures, wherein like numerals denote like elements, and wherein:

FIG. 2A illustrates a pneumatic bending actuator (PBA) that achieved a locking functionality based on interaction of inherent inflation with a 'trench' housing in accordance with an embodiment;

FIG. 5A illustrates stage 1 of the fabrication of the pneumatic bending actuator (PBA), in accordance with an embodiment;

FIG. 5B illustrates stage 2 of the fabrication of the pneumatic bending actuator (PBA), in accordance with an embodiment;

FIG. 5C illustrates stage 3 of the fabrication of the pneumatic bending actuator (PBA), in accordance with an embodiment;

DETAILED DESCRIPTION

Figure 1A:
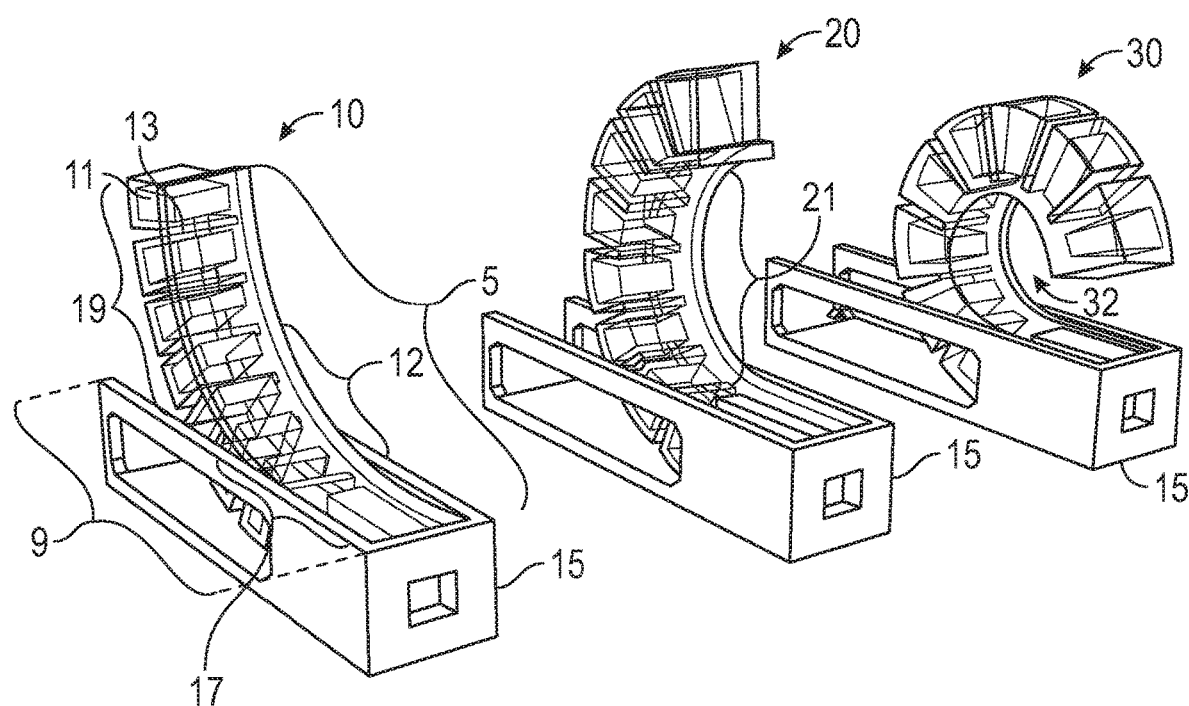
FIG. 1A illustrates a pneumatic bending actuator (PBA) unconstraint in a 'trench' housing in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

For the sake of brevity, the connecting lines shown in the various figures contained herein are intended to represent example functional relationships and/or physical couplings between the various elements. It should be noted that many alternative or additional functional relationships or physical connections may be present in an embodiment of the present disclosure.

The systems, apparatus and methods for object constraint include the features of sequential inflation for limiting and retention, and various element architectures with the locking feature integrated in array structures for use across cargo surfaces.

While the disclosure describes object constraints using arrayed inflatable features particularly for use in vehicles, it is contemplated that the present disclosure is applicable to object restraint or constraint in a variety of vehicle types, as well as for use in a non-vehicular environment. That is, the present disclosure and object constraint systems, apparatuses and methods applicability should not be construed as limited to vehicular use but have applicability in a variety of different environments and settings.

Creating storage solutions for the retention and location of the wide variety of objects and sundries an occupant may bring into a vehicle involve a variety of factors. For example, the features may include self-limiting/locking features within the inflatable array elements allow for retention of objects with various form factors and aspect ratios.

On the surface, the average driving experience is largely dictated by externalities: weather or traffic conditions, or by vehicle performance: acceleration, responsiveness, braking, etc., and these traits often control the perception of the quality of a trip. For instance, if asked, "How was your trip?" common responses could sound like: "Awful, traffic was a nightmare," or "Nerve-wracking, the roads were icy," or even "Great, my new car handles like a dream."

However, anything more than a cursory observation of this action will reveal that there is far more going on inside the vehicle that impacts the modern driving experience. That is, the drivers, passengers and occupants perform a variety of actions in the interior of a vehicle; for example, drivers, passengers and occupants listen to audio, maybe through the radio or an mp3 player; transport objects such as groceries or maybe tools for work; navigate using GPS devices; drink a coffee or eat fast-food; talk on the phone etc. A common occurrence seen when occupants perform these actions is that occupants are bringing items into the vehicle that impact the occupant's driving experience by enabling the driver to perform additional tasks while in the vehicle.

During the course of operation and movement of a vehicles, objects in the interior (and for that matter also in the exterior) may need to be constrained to prevent damage of the objects from commonly experienced bumps, jerks etc. from the vehicular motion. Also, the type of constraint used may vary by object; some, like a GPS or smart device, may need to be constrained in a position where a driver can see a screen and easily interact with it, while other things, such as groceries for instance, may simply need to be held in place as to not spill or break in any arbitrary location.

There have been many different solutions traditionally used to counter this issue; that is, such object constraint system or attachments can be found in a plethora of different forms. For example, a broad categorization may include a first category defined as pockets or storage box constraints which are integrated or built into a vehicle console or dashboard. For example, such constraints can include compartments of a glove box, a seat-back pockets, or a cup holder. While such constraints may be considered object non-specific (i.e. any arbitrary chosen object with a small enough size may be placed into one of such compartments) and can be reasonably achieve constraining objects from movement during vehicular motions, these types of restraints are not all encompassing of a particular object. These constraints often do not allow for easy visibility or access to the object constrained. For example, it is not often desired to place a GPS device inside a glove compartment and have an expectation of use of the device while driving the vehicle. Other restraints include volume constraints for groceries; while groceries do not require user interaction while being transported, the use of seatback pocket is not feasible because of size limitations which in turn affects overall usefulness.

Another subset of traditional vehicle attachments is object mounts. These can be considered after-market additions to a car that are designed to hold a specific object in a certain location/orientation; usually in a place where a driver can see or touch the object which is mounted. An example, of such mounts are dashboard mounts for smart devices. While the specialization of this particular mount is specific to the object mounted, such mounts are often considered successful by a user for the intended purpose. However, a significant drawback is the necessity of such mounts to be object-specific, which means requiring a user to purchase a different mount for each device type requiring constraint. For example, a group may include plural users such as in instances of a family of several members each having a device requiring a mount in a vehicle. In this case, each member has a different kind of cellphone and wants to easily access them when driving to control their music. Each of these devices will require its own specific mount, which may all need to be placed around the same general dashboard area. Further, each mount will also only be useful during the fraction of time the user with the paired device is driving the vehicle, and when not in use valuable real estate on the dashboard is wasted. There are mounts that attempted to cater to multiple devices but with limited success and it can still be said these are highly specialized within the scope of all objects that are constrained in vehicles. That is, one could not use such mounts and attachments to hold, for example a beverage or soda can.

A third category of object attachments can be defined as cargo constraints. These are constraints that include rails, mounting points for ratchet straps, cargo mats and constraints used for larger and heavier objects. While these cargo constraints are generally strong, they are also heavy and can require intricate or extensive configurations in the vehicle for use which in turn can pose difficulties or even impossibilities to reconfigure if needed while driving. These types of constraints are also not easily adaptable or adoptable for smaller or more delicate objects.

Therefore, it is desirable to have cargo restraints that do not suffer from the above drawbacks which include obtrusive design, object specificity, weight, and difficulty to manually configure or re-configure.

It is desirable to have cargo constraints that overcome these drawbacks and are lightweight, object-independent, easily engaged, can be stowed in a non-obtrusive manner, and can hold objects at specific orientations/positions.

Inflatable, or soft-robotics based grippers provide an attractive solution. Inflatable devices are inherently lightweight and can be stored in small packing volumes when deflated. Internal pneumatic-networks allow for complex motion to be actuated from less sophisticated control (inflation) and thus potentially allowing for less difficult manual configuration. Additionally, the inclusion of an inflatable device could be a unique feature that vehicle manufactures could use as a selling point.

Inflatable grippers include a class of Pneumatic Bending Actuators. A Pneumatic Bending Actuator (PBA), also commonly referred to as Pneumatic Curling Actuator, Soft Pneumatic Actuator, or PneuNet actuator is essentially a 'finger-like' soft actuator composed of two parts bonded together: a hollow, elastic half that can inflate, and a flexible yet inelastic (strain-limiting) half. The inflation and subsequent elongation of one side causes the actuator to curl around the more inextensible side. Internal pneumatic networks that are more complex than a simple hollow chamber can be implemented to improve the performance (actuation speed, force output, etc.) or alter the behavior (twisting, 'corkscrew' bending, etc.). These actuators are amenable to a variety of sizes and shapes and are relatively simple and cheap to make.

In various exemplary embodiments, the present disclosure provides systems, methods and apparatuses for object constraint within vehicles that utilizes inflatable systems, which can be lighter, easier to deploy/store, and more adaptable to different object sizes and shapes, that are currently lacking for various reasons including heavy, difficult configuration, object specific, etc.

In various exemplary embodiments, the present disclosure provides systems, methods and apparatuses for object constraint using Pneumatic Bending Actuators, while introducing a design implementation that invokes a secondary actuation process caused by the flaring of chambers of the PBA. This actuation is combined with a housing 'trench' to create a locking mechanism that prevents actuation of constrained portions of the PBA, which is done in order to ensure its output force is not enacted in any direction away from the surface, which would undermine its clamping potential. These components combine to form a modular element, arranged in various patterns on a mounting plate to create a larger array, which is more versatile in gripping larger objects.

Figure 1B:
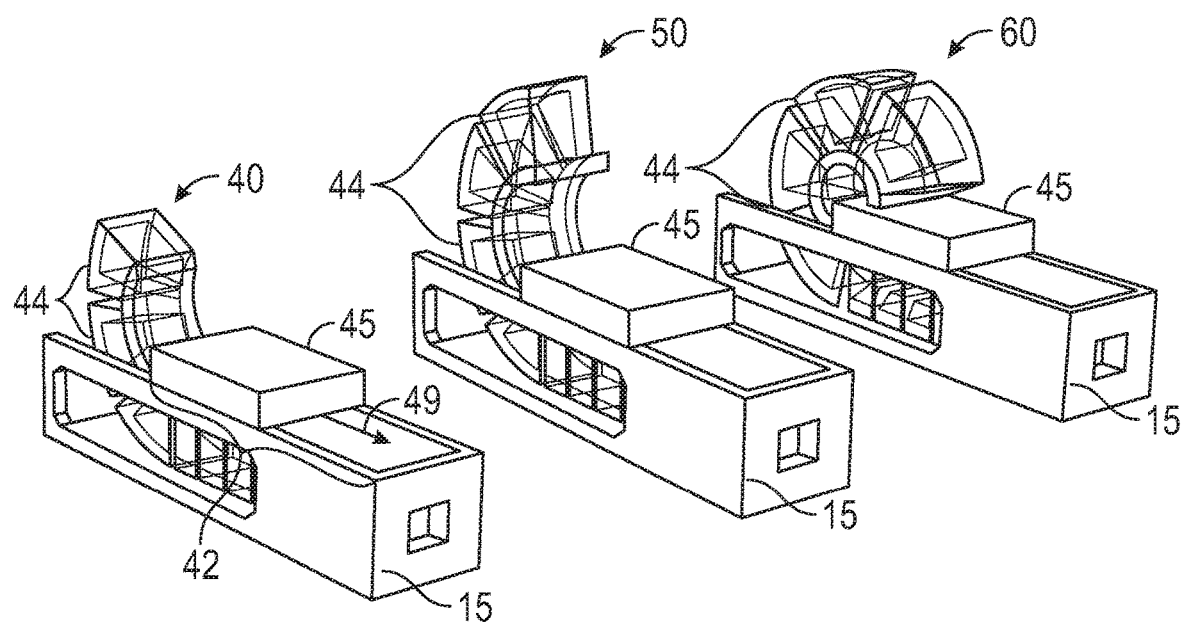
FIG. 1B illustrates a pneumatic bending actuator (PBA) constraint with a locking functionality based on interaction with a 'trench' housing in accordance with an embodiment.

FIGS. 1A and 1B illustrate array structures with inflatable features/architectures for cargo retention where the inflatable elements have features which self-limit their motion when interfacing/retaining objects of various shapes and sizes in accordance with an embodiment. In various exemplary embodiments, an Inflatable Attachment Array is configured by a user and consists of multiple PBAs or multiple sets of PBAs. That is, a repeating pattern of PBAs is configurable to be embedded onto a surface (i.e. attached to a trench that is positioned on or within a surface) and arranged in such a manner that, when each of the PBAs in manipulated or actuated, each PBA will curl around any object placed on or against the surface and constrain it in place, coincident to said surface. That is upon exerting a perpendicular force to each PBA, a part of the PBA with exhibit a spring like grasp due to prior configurations of the PBA to grasp the object for an attachment or holding by the PBA. The top surface of the PBAs is flat in order to allow for a smooth surface when deflated. The actual pattern or configuration of the array will be discussed later in greater detail. The configuration (i.e. design) can be broken down into two subsets: the configuration (i.e. design) of the elemental ('finger') component (with associated modular locking mechanism), and the configuration (i.e. design) of the larger arrangement of the elements (array configurations).

FIG. 1A illustrates a set of pneumatic bending actuators (PBA) 10, 20, 30 which are unconstrained in a housing trench 15. The pressurization (during manufacturing) causes chambers 11 to inflate resulting in contact forces between each chambers 11 to repel each other. This results in the PBAs 10, 20, 30 exhibiting varying degrees of curvature as a result of the pressurization. The inextensible top layer 13 does not give or extend forcing each PBA 10, 20, 30 to be manipulated or re-configured into a curved state (i.e. each PBA acts like finger that curls). The unconstrained finger (i.e. part 19 of the PBA 10) moves freely from within the trench 15 and exhibits a large radius of motion which is called the unconstrained motion.

That is, part of each PBA 10, 20, 30 is reconfigured from a flat position from a state where the entire length 5 of the PBA lies flat unconstrained within the length 9 of the trench 15; to a curved position where a part of the PBA 10, 20, 30 extends out of the trench 15 at a curved angle 12 as example for PBA 10. In this case, part 19 of the PBA 10 extends out of the trench 15 while part 17 of the PBA 10 remains within the trench 15. The chambers 11 are constrained as a flare between a center portion of each chamber (i.e. each chamber is divided in half) is by a perpendicular force imparted by the sides of the trench 15 that presses the chamber sides together and enables the chambers 11 to exert an outward lateral pressure or force when in the trench 15 to be held within the trench 15 in a constraint position. In addition, this design implementation invokes a secondary actuation process caused by the flaring of chambers 11 themselves of the PBA. This actuation is combined with a housing 'trench' to create a locking mechanism that prevents actuation of constrained portions of the PBA, which is done in order to ensure its output force is not enacted in any direction away from the surface, which would undermine the PBA clamping potential.

In various exemplary embodiments, the part 17 which remains with the trench 15 is attached or interlocked into the trench 15. The curved angle is increased in curvature where the part of the PBA outside of the trench 15 is further configured in a more curvature position as shown in by curved angle 21 for PBA 20 and curved angle 32 for PBA 30. The curved angles of the part of the PBA outside the trench 15 are configured like figures to enable sets of PBAs to perform actions like hold and gripping of items.

In various exemplary embodiments, a weight of the object (not shown) on the retaining features of the PBA 20 can determine a part of a gripping feature (i.e. the curved angle 21 of the PBA that grasps an object (not shown)) is constrained in the trench 15 versus the part that is deployed. In general, the PBAs 20 are configured for gripping fingers (i.e. part of the PBA outside of the trench 15) to initially deploy at onset of an activation; and those gripping fingers that are blocked or partially blocked by the object (as a result of the object weight blocking the deployment in the upward direction) redirect the deploying operation to a full or partially constraining operation for each respective gripping finger. In an exemplary embodiment, in this manner, each of the gripping fingers that surround the object on a surface can be deployed to restrain the object, but PBAs which found below an object on the surface are self-constraint and are prevent from upward movement to exert opposing forces to lift or move for an initial position of the object.

FIG. 1B illustrates a set of pneumatic bending actuator (PBA) 40, 50, 60 which are constrained in a trench housing with a locking part 45 of the 'trench' housing. The trench housing allows a constrained part 42 of the PBA by locking a part 42 of the PBA 40 to remain flat; and this enables a flat surface for a part 42 of the PBA 40 to prevent an object from tipping, lifting, or translating when resting on part of the PBA 40 (i.e. by resting on a flat surface of part 42 of the PBA 40) and the object is not off balance by virtue of otherwise being rested on an uneven surface. The part 42 is constrained due to the locking part 45 which constrains the part 42 of the PBA 40 in the trench 15. The trench 15 housing is characterized by holding part of a single PBA 40 with or without a locking part 45. The locking part 45 can be adjusted 49 to enable a lesser or greater portion of the PBAs 40, 50, 60 to be constrained in the trench 15 (i.e. a greater or lesser percent constrained (locked)) of each PBA 40, 50, 60. PBA 50 shows the PBA 50 in the trench 15 with locking part 45 manually manipulated to be in at a more curved angle for the part 44 of the PBA 50 outside the trench 15. Likewise, PBA 60 shows the part 44 of the PBA 60 outside of the trench 15 to be manipulated in an even more curved angle and curved state than the PBA 50; hence the degrees of curvature of the PBAs 40, 50, 60 are each still adjustable even with the locking part 45.

Each of the pneumatic bending actuators ("PBAs") in particular configurations can be used to grip small objects such as fruit, vegetables, or other non-standard, but similarly sized objects. In various exemplary embodiments, such convenient grips positioned within the interior of a vehicle can enhance the driving experience by enabling items easily attached to vehicle for holding and using by the occupants of the vehicle.

FIG. 2A illustrates a pneumatic bending actuator (PBA) 210 that achieves a locking functionality based on interaction of inherent inflation with a trench housing 215. The PBA uses a material that is less soft than in FIGS. 1A and 1B, this results is changes in a number of attributes of the PBA 210 when compared with the PBAs of FIGS. 1A and 1B. For example, PBA 210 may have more continuous inflation and deflation of its chambers 217 and has holding performance (i.e. when gripping an item by the PBA 210) in different arrangements. FIG. 2A includes a PBA 210 with approximately ~25% smaller footprint than the PBAs of FIGS. 1A-1B, a stiffer material, a more simplified housing trench and split chambers (i.e. chamber 217) for flaring i.e. a fundamentally different locking mechanism. That is, the chamber 217 is configured in a split chamber 232 that flares when inserted in the trench by exerting perpendicular forces to the sides 218 (and 238 and 239 of PBA 230) of the trench housing 215. In addition, the sides 218 of the trench housing 215 may be configured with a lip that holds the PBA 210 in the trench housing 215 by the flare edges 239, 228 expanding slightly in the trench housing 215 after insertion to expand in a manner that allows a slight overlap of the lip 239, 238 to enable the PBA (i.e. 230) part 235 to be held in the trench housing 215 by the overlap. Also, The PBA 210 has improved gripping of an object because of the stiffer material to grip the object with no diminishing returns or downside to the smaller foot print and size of the PBA 210 when used (i.e. use of the stiffer materials acts to compensate in instances when the size of the PBA is smaller). In addition, in a configuration of multiple PBAs, the staggering PBAs 210 with less stiff PBAs allow the stiff region to be continuous experienced and enabled for a wider range for the gripping of items without all the PBAs actually having to use the stiff material. Further in FIG. 2A, configuring a modular trench for the trench housing 215 enables convenient reconfiguring of the PBA 220 finger length 222 and number of chambers 224 constrained and not constrained within the modular trench.

Figure 2B:
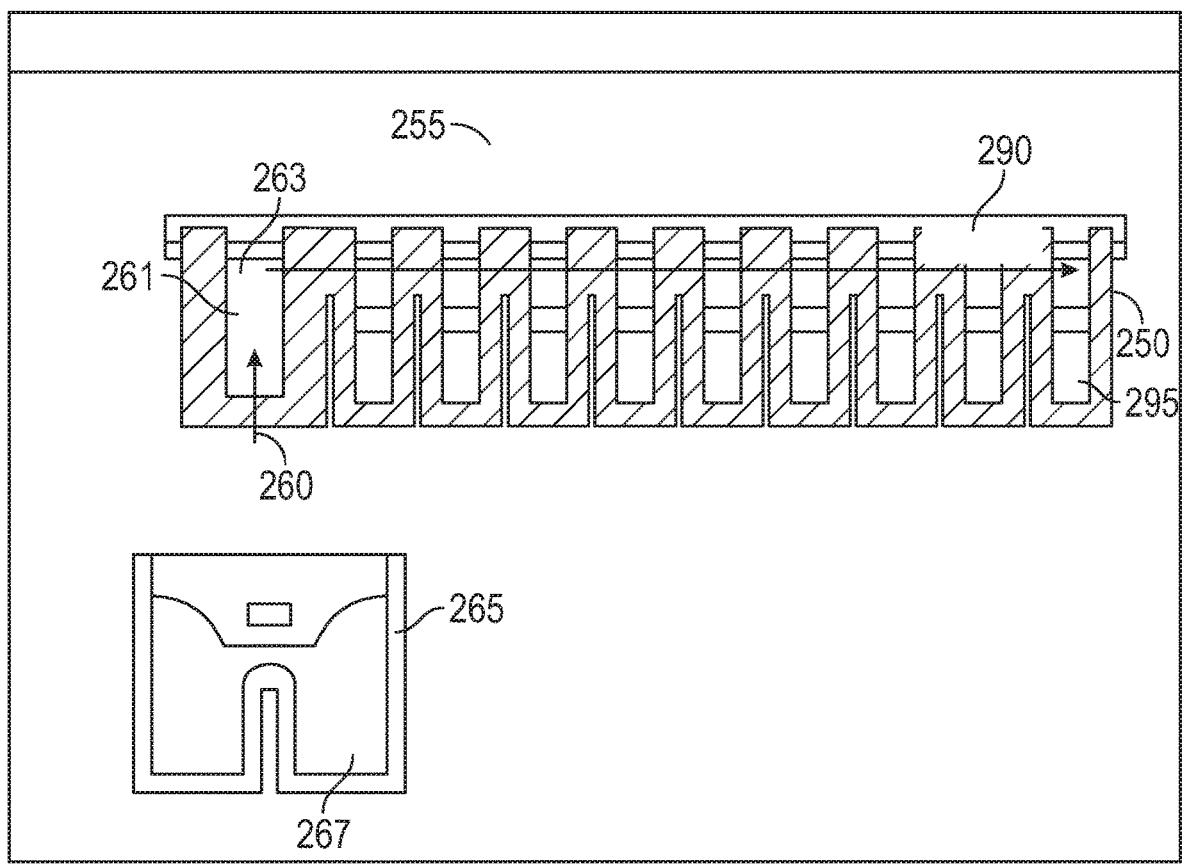
FIG. 2B illustrates the internal architecture of the pneumatic bending actuator (PBA) of FIG. 2A., in accordance with an embodiment.

FIG. 2B illustrates the internal architecture of the pneumatic bending actuator (PBA) of FIG. 2A. The PBA 250 is depicted in horizontal cross section view with chambers 295, and larger air intake chamber 261 for the air intake 260 and an inextensible layer 255 on top of the chambers 295. The design parameters for the PBA 250 include attributes like the bending radius, actuation speed, force output, and the required volume delta to achieve the full range of motion controlled by inputs such as material property, pneumatic network configuration (number/configuration of chambers, split vs. connected chambers, etc.), and inflation rate. In FIG. 2B, there is an inextensible layer 255 that defines the finger length of the PBA 250, causes the curvature deformation by compressed air by not extending, and caps one side of chambers 295 to enable the air cavity 267 to expand in an outward and perpendicular manner causing the curvature of the PBA 250. As explained, the chamber 265 is a split chamber that has an air cavity 267 that receives air intake 260 across the inextensible layer 255 (i.e. layer that cannot be further extended or stretched), that results when air is squeezed into each of the chambers by the outward curved deformation of the PBA 250 by each chamber 295 expanding towards the sides that exhibit less rigidity.

Figure 2C:
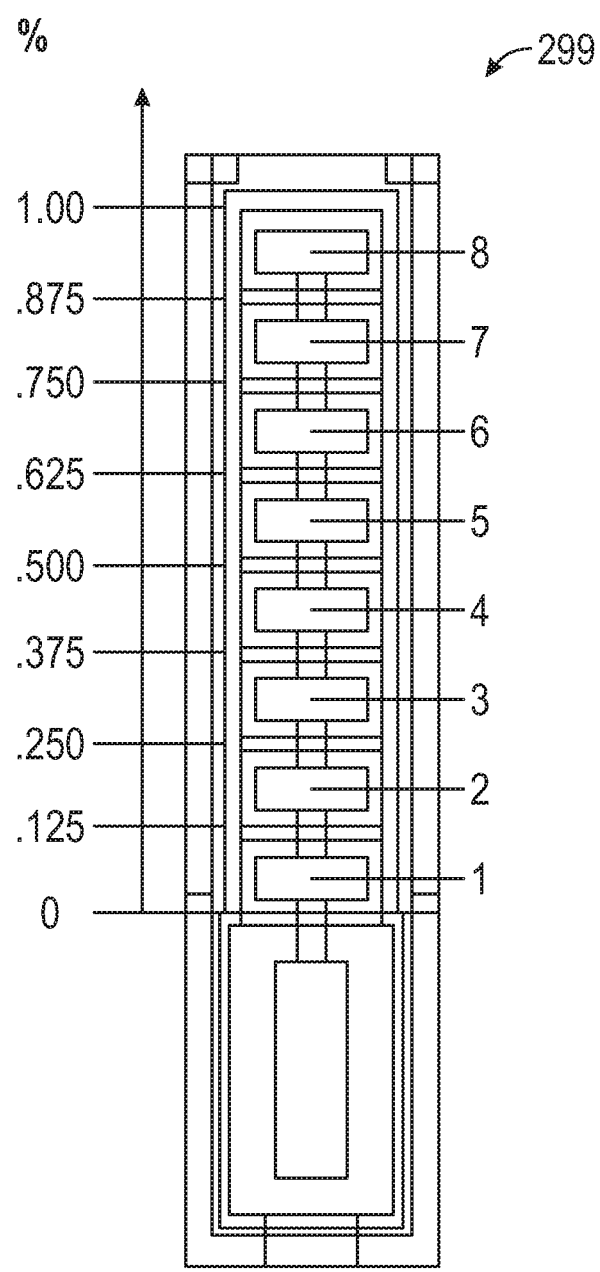
FIG. 2C illustrates the different constraint levels in each chamber of the PBA that can be provided by a locking mechanism, in accordance with an embodiment.

FIG. 2C illustrates a diagram of constraint levels in each chamber of the PBA that may be required and can be provided using the locking in accordance with an embodiment. FIG. 2C, illustrates a diagram of levels 0.0% to 1.00% of a PBA 299. Any portion of the PBA that is underneath an object which is being gripped should subsequently not be actuated and therefore would have a desired approximate 0.0% level constraint, as higher constraint levels would push the object out away from the surface, thus counteracting the desired constraint. While this issue could be mitigated for completely constrained PBAs by not pressurizing them, this introduces further complexities as to controlling individual elements separately and potentially sensing where an object is located on the array. Additionally, partially constrained PBAs would still need to actuate at only the non-constrained sections. Therefore, to overcome this need for different constraint levels, the locking mechanism, or 'trench', was developed to restrain any actuation of a constrained PBA without requiring a complex system to otherwise control the inflation level required as illustrated in FIG. 2C. This mechanism is essentially a plastic housing that surrounds the PBA in a trench. There is space to allow for 'side' expansion of the PBA (perpendicular to the bending direction), with a 'retaining lip' designed to lock in any portion of the PBA that achieves a certain level of side expansion and providing a flat surface that does not counteract the constraint goal of restraining or gripping an object.

Figure 3A:
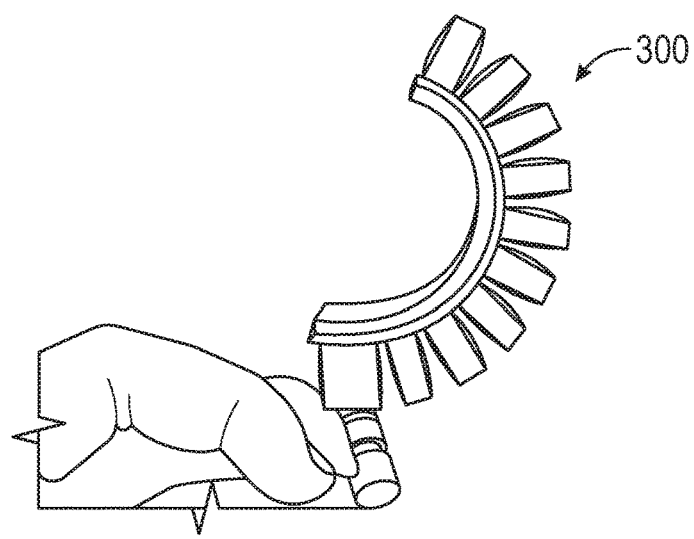
FIG. 3A illustrates the bending of a pneumatic bending actuator (PBA), in accordance with an embodiment.

FIG. 3A illustrates the bending of a pneumatic bending actuator (PBA) 300. Pressurization causes chambers to inflate result in contact that forces chambers to repel each other and inextensible top layer forces the finger of PBA 300 to curl. FIG. 3A is described in reference to elements in FIG. 2B. One objective of the design is to maximize both the force output and the ease of deployment, and thus spilt chambers, which have been shown to improve both force output and actuation speed compared to the connected-chamber variation, are utilized. The design has one larger intake chamber (See FIG. 2B, intake chamber 261), which is scaled to accommodate the insertion of the air intake tube, which allows the PBA 300 to be pressurized. The upper contact surface (FIG. 2B, surface 263) is flat so that the surface of the overall attachment can remain flat when deflated. No distinctive inextensible material (FIG. 2A, inextensible layer 255) is in the non-inflating half, as the increased thickness in this region, along with the stiffness of the material allows for a large enough differential in expansion between the two halves (FIG. 2B, split chambers 265) to facilitate bending.

Figure 3B:
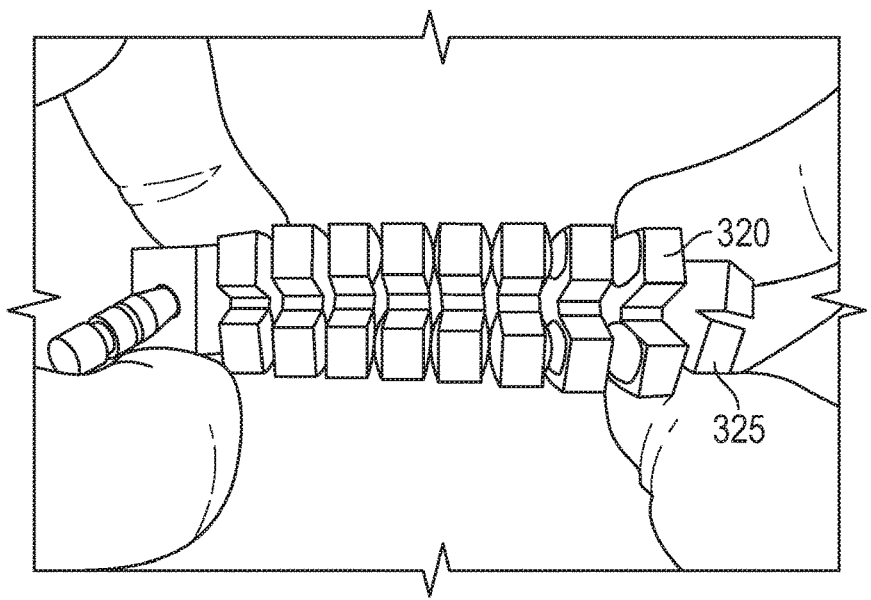
FIG. 3B illustrates the flaring and locking of the pneumatic bending actuator (PBA), in accordance with an embodiment.

FIG. 3B illustrates the flaring 320 and locking 325 of the pneumatic bending actuator (PBA) 320. With an array of PBAs 320, when placing an object onto the array, some 'fingers' will inherently be completely or partially covered.

Figure 3C:
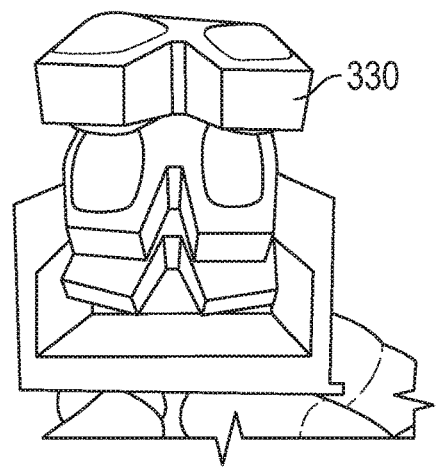
FIG. 3C illustrates the constrained chambers flare into the trench and the prevention of the bending of the pneumatic bending actuator, in accordance with an embodiment.

Any portion of the PBA that is underneath the object should subsequently not be actuated, as this would push the object out away from the surface, thus counteracting the desired constraint. While this issue could be mitigated for completely constrained PBAs by not pressurizing them, this introduces further complexities as to otherwise controlling individual elements separately and potentially sensing where an object is located on the array. Additionally, the partially constrained PBAs would still need to actuate at only the non-constrained sections, so this solution would not be useful FIG. 3C illustrates the constrained chambers flare 330 into the trench (not shown) and the prevention of the bending of the pneumatic bending actuator by the chamber flare 330. A simple locking mechanism, or 'trench', enables a restraint of any actuation of a constrained PBA (i.e. flare 330 of the chambers squeezed into the trench) without requiring a complex system to control the inflation level. This mechanism is essentially a plastic housing (i.e. the trench) that surrounds the PBA 320 (of FIG. 3B) in a trench. There is space to allow for 'side' expansion of the PBA (perpendicular to the bending direction), with a 'retaining lip' designed to lock in any portion of the PBA that achieves a certain level of side expansion. This side expansion occurs naturally as the PBA is pressurized, however with stiffer materials it was shown to be much less significant. As such, a unique pneumatic geometry improves this side expansion by introducing a secondary actuation method: flaring. Each inflating chamber is split down the middle, thus easing the side expansion by adapting the same principle that causes bending to occur in the perpendicular direction as well. These splits are only made partially down the chambers (compared to full splits between bending chambers) to ensure bending is still the primary actuation method and flaring only occurs at higher pressures. This is to allow the non-constrained portion of the PBA 320 to bend out of the trench before flaring and not locking the entire non-constrained PBA 320 in the trench.

Figure 4A:
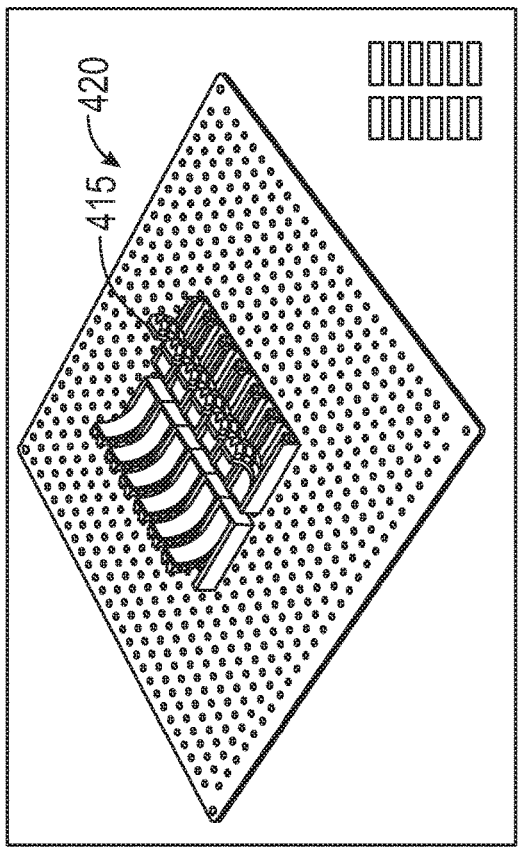
FIG. 4A illustrates an array 1 with rotational symmetry of the pneumatic bending actuator (PBA), in accordance with an embodiment.
Figure 4B:
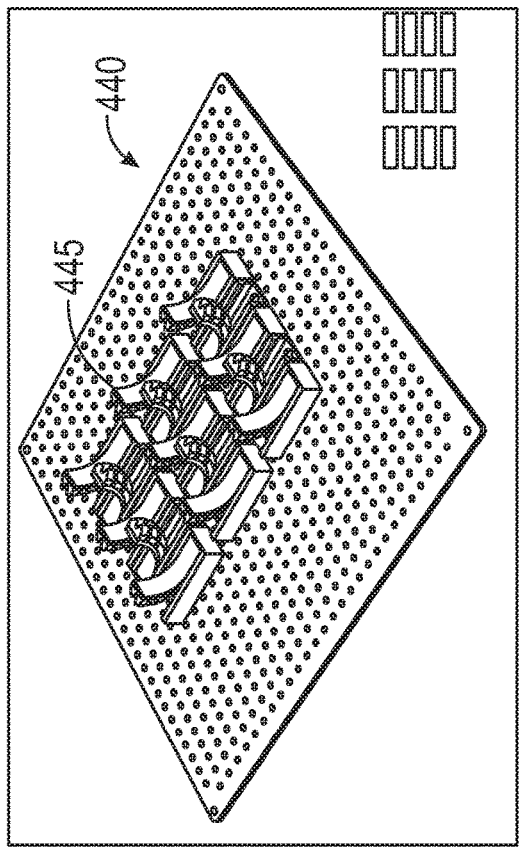
FIG. 4B illustrates an array 2 with reflectional symmetry of the pneumatic bending actuator (PBA), in accordance with an embodiment.
Figure 4C:
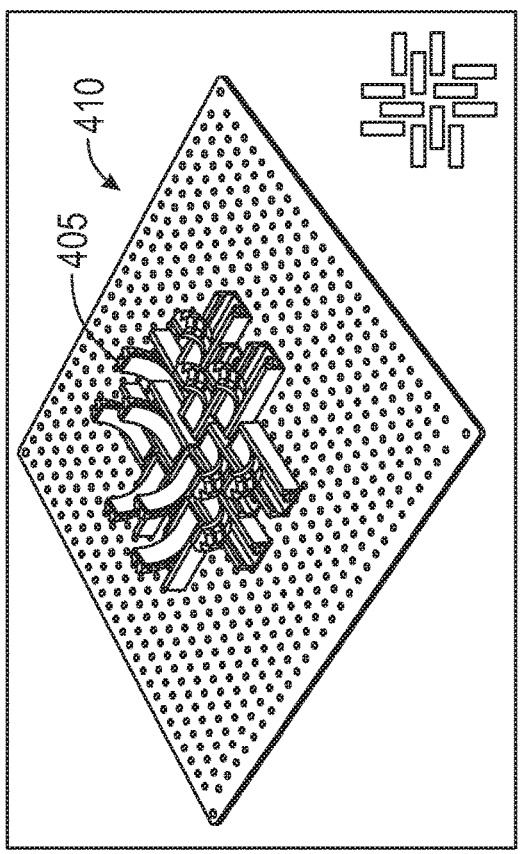
FIG. 4C illustrates an array 3 with double reflectional symmetry of the pneumatic bending actuator (PBA), in accordance with an embodiment.
Figure 4D:
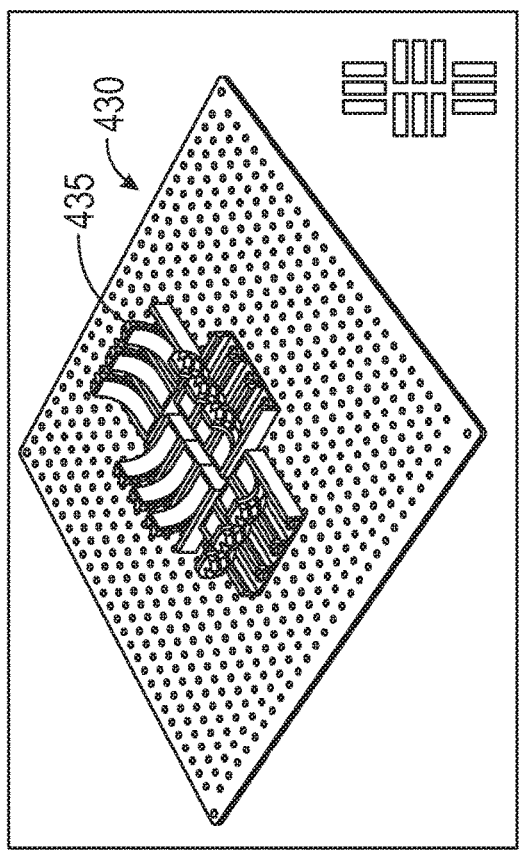
FIG. 4D illustrates an array 3 with localized symmetry of the pneumatic bending actuator (PBA), in accordance with an embodiment.

FIG. 4A illustrates an array 1 with rotational symmetry of the pneumatic bending actuator (PBA). FIG. 4B illustrates an array 2 with reflectional symmetry of the pneumatic bending actuator (PBA). FIG. 4C illustrates an array 3 with double reflectional symmetry of the pneumatic bending actuator (PBA). FIG. 4D illustrates an array 3 with localized symmetry of the pneumatic bending actuator (PBA).

The different arrays of PBAs in FIGS. 4A-4D, are based on the principle that every component has a pair that is either a plane or point reflection of its twin. This is to ensure any constrained object is always held on more than one side and will not slip out of the constraint. Besides this, each of the arrays 410, 420, 430 and 440 is designed based on two driving characteristics: symmetries (reflection, rotational, localized, etc.) of the components, and overlaps (the varying the levels of constraint that would be observed by placing a rectangular object on the array). All configurations may be also constrained to align within the Cartesian grid of the mounting plate.

FIG. 4A illustrates an array 1 with rotational symmetry of a set of pneumatic bending actuators (PBA) 405. The first design, the array 1 "410," is a rotationally symmetric design with highly varied overlap of the PBAs 405 throughout the array 1 "410." FIG. 4B illustrates an array 2 "420" with reflectional symmetry of a set of pneumatic bending actuators (PBA) 415. The second design, the array 2 "420," is a more basic reflectionally symmetric design with uniform overlap than the first design, the array 1 "410." FIG. 4C illustrates an array 3 "430" with double reflectional symmetry of the set of pneumatic bending actuators (PBAs) 435. The third design, the array 3 "430," uses a double reflection with minimal differences in overlap of the PBAs 435. FIG. 4D illustrates an array 4 "440" with localized symmetry of the set of pneumatic bending actuators (PBA) 445. The design of the array 4 "440," uses a more unique localized symmetry with heavy overlap in the set of PBAs 445.

The pneumatic network design for each set of the arrays 410, 420, 430 and 440, requires that all of the elements (i.e. PBAs) are connected to a single pump and are inflated simultaneously. In various exemplary embodiments, while each of the arrays include sets of PBAs that are uniformly or independently controlled and configured to enable a multitude of support, hold and gripping operations of different types of objects as desired. The connections of the PBAs in each of the arrays in series or in parallel have not been observed to affect the speed or stability of the inflation process of each PBA. The tubes to connect to the PBAs are connected underneath the mounting plate. The size of the arrays 410, 420, 430 and 440 were limited to twelve total components (i.e. PBAs), however each design was created and contemplated to have the potential to continuously expand in all directions with any number of PBAs. That is, in various exemplary embodiments, it is contemplated, that multiple sets and large configurations of similar as well as other designs can be implemented and the 4 array designs of FIGS. 4A-4D should not be considered as the limited number of designs. While, the exemplary four design configurations presented were essentially arbitrary, the four selected designs were chosen from a varied set of designs in both overlaps and symmetries to demonstrate a range of potential configurations of different gripping or holding enabled performances. Further, qualitative differences in expected functionality for each of the four arrays can be optically derived. For instance, in an exemplary embodiment, the optimal location or locations within each of the arrays to maximize the holding performance is the location where the most 'fingers' can grip the object, which is largely dependent on the type of symmetry of the PBAs in the array itself.

FIG. 5A illustrates stage 1 of the fabrication of the pneumatic bending actuator (PBA). FIG. 5B illustrates stage 2 of the fabrication of the pneumatic bending actuator (PBA). FIG. 5C illustrates stage 3 of the fabrication of the pneumatic bending actuator (PBA).

As illustrated in FIG. 5A, to fabricate the PBAs, each PBA is molded with a silicone elastomer. PBAs can be fabricated using a variety of different materials, including elastomers or polymers. In exemplary embodiments, using a silicone elastomer, Elastosil M 6401 A/B, which shore hardness of 28 (A-scale). The accompanying locking trench is made up, in an exemplary embodiment, of 3D printed Village Plastics ABS. The intake tube is a silicone-based tube (ex. McMaster-Carr), and this tube is bonded in with silicon-poxy. Addition materials required for fabrication may include a scale, a sealable 600 mL glass jar, a medical syringe, a vacuum, an over, (or a vacuum oven), and a thin blade.

The limiting constraint that may result in the fabrication process is the pot life of the silicone, which is 30 min. As such, it's only feasible for one person in this exemplary process to mold two PBAs with each batch. To begin the process, the silicone elastomer, which comes in two parts, is combined. 50 g (5 g part A, 45 g part B) are poured into a 600 mL glass jar and mixed by hand, then the mixture is placed in a paint mixer for an additional 2 minutes to ensure homogeneity. A centrifuge could alternatively be used. Once the mixture is consistent, it needs to be degassed. The mixture is placed into a vacuum and pressurized to >1.0 MPa for ~12-15 minutes. The mixture will expand during this process, pouring more than 50 g into a 600 mL jar will increase the risk of overflow. After this allotted time, the mixture is removed from the vacuum; no bubbles should be hereafter observed. The mixture is then poured into a medical syringe; the plunger is removed to allow the material to be more easily poured in. The needle is removed to achieve a larger opening for the more viscous material.

Using this syringe, the material is poured into the Lower Cavity Mold 505 in Stage 1 of FIG. 5A and the Lower Tray Mold 510 of stage 2 of FIG. 5B. Pouring is done slowly and with a constant rate of flow to minimize bubble formation. Once both molds 505, 510 are filled, the upper portions (515, 520) are slowly pressed into the lower halves, allowing for the silicone to envelope the inserted molds without creating any air pockets. It is important to make sure the arrows in the molds are facing the same direction. Weights are placed on top of each mold to ensure they are fully compressed. These molds are placed in an oven for 25-30 minutes at 80° C. for curing at 530 and 535. While the actual elastomer should cure in 10 min at 80° C.[8], the molds insulate the silicone and thus require additional time to fully cure. After the curing at 530, 535 is complete, any overflow is peeled away the molds are separated. The molded components 540, 545 are removed from their respective molds and the excess flash is cut away. The contact surface component 510 (in FIG. 5C) of stage 3 is then placed back into the lower tray mold in the same orientation.

Next, the intake tube is added to the main cavity. A thin blade is used to cut a small X shape in the bottom of the intake chamber. A ~1.5" section of tubing is cut and a rigid rod is inserted into this tube. Together, this rod and tube are poked through the X in the Intake chamber, and the rigid rod is subsequently removed leaving the intake tube in the main cavity component. The tube is bonded to the silicone component using the Sil-poxy. The Intake Chamber is filled with the Sil-poxy, while an additional thin rim it added to the outside. This is allowed to dry for 5 min.

An additional 20 grams of the elastomer is subsequently prepared following the previously described procedure. This new material is poured on top of the contact surface 510 (of FIG. 5C) component up to the top edge of the lower tray mold. The main cavity 550 is then placed onto the Contact Surface 510 component; the extrusions should align with the slots in the Contact surface component. Additional silicone is then poured around the edge of the components, sealing them together. The combined component 555 is then cured again. After 25-30 min, the component is finally complete, however it is then left to sit for an additional 24 hours at room temperature to ensure it is completely cured.

Figure 6:
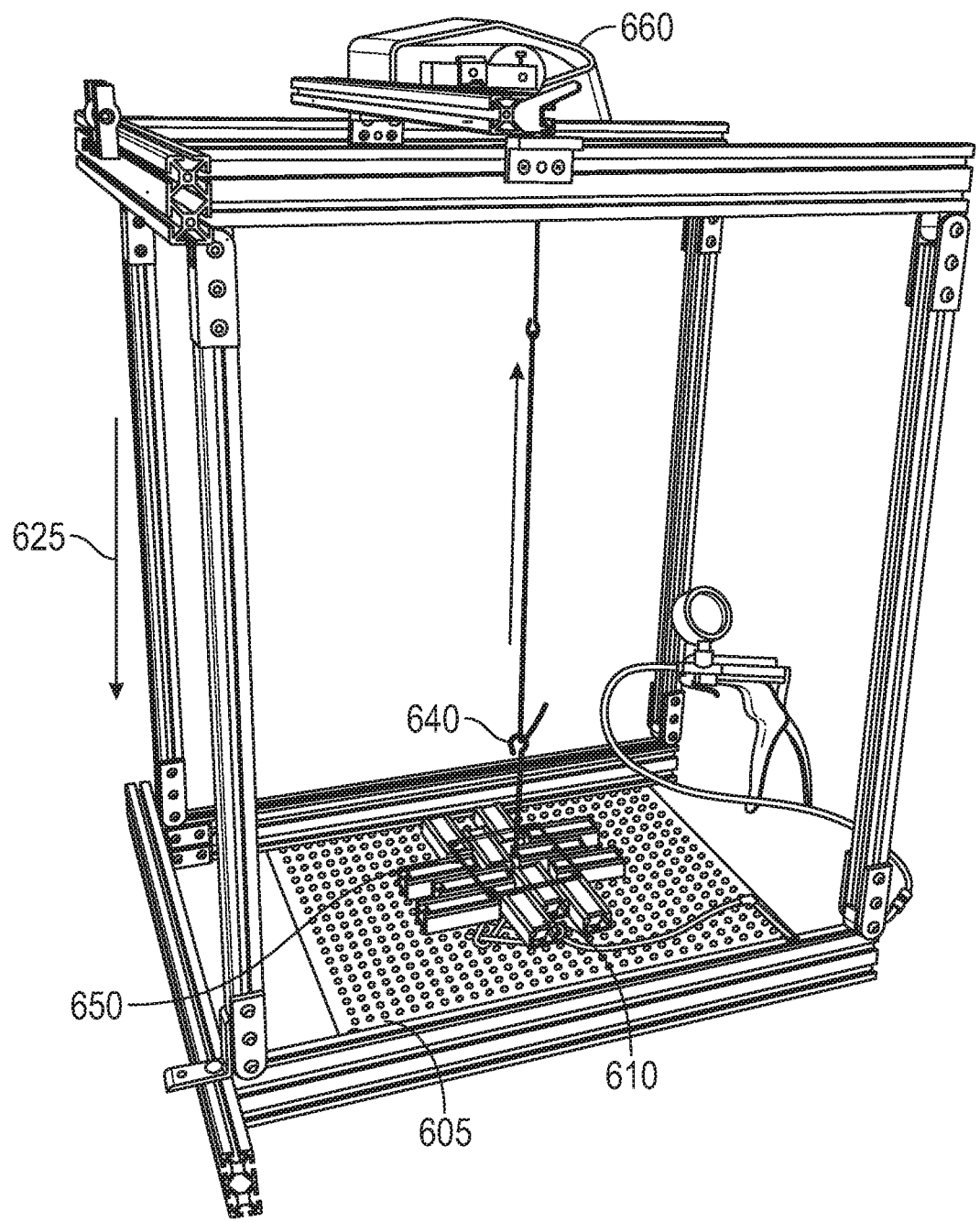
FIG. 6 illustrates an empirical set-up for configuring and testing a particular array configuration, in accordance with an embodiment.

FIG. 6 illustrates an empirical set-up and characterization for configuring and testing a particular array configuration, in accordance with an embodiment. The following is a basic, upper lever characterization intended to serve as a starting point to determine optimal array configurations, as well as the overall viability of the design. The goal of this characterization is not necessarily to examine every aspect of the gripping performance of our elemental PBA design. The intent is to specifically lay the groundwork in predicting holding performance of larger arrays, as well as assessing the general viability of the inflatable attachment array in producing useful gripping forces.

The characterization will focus on measuring the perpendicular holding force (normal to the surface) that each of the four specified array configurations can generate relative to the size of the constrained object (and thus relative to number of engaged PBAs and the level of constraint for each). A basic 2-PBA configuration was characterized to serve as a baseline and later develop a predictive model.

In FIG. 6 the procedure for the set-up includes: step 1. to configure desired array 610; step 2. to select plate from a set of multiple plates 605 which are stacked to increase height; step 3 to inflate the array to 15 psi; step 4. to apply precision weights to other side 625; step 5. a displacement is tracked by a marker on the line 640 recorded by another camera (not shown); step 6. weight is added until the plate is released; and step 7, the procedure is repeated at each configuration for each object size.

For this experiment, square prisms of various sized bases and heights are placed onto each array in the location where the most 'fingers' (i.e. 650 as an example) can grip it. For some configurations, this is a constant location, while for others it varies for different base sizes. Once located, the PBAs are inflated and a load is applied at the center of the object, perpendicularly out from the array surface. As this load is increased, the vertical displacement (on the line 640) of the object from the array surface is recorded. The load is increased until the object is released and a force vs. displacement curve is plotted.

The load is applied using a simple pulley system 660; a line is hooked into the constrained object, and precision weights (not shown) are applied to the other end. The mounting plate is screwed into the fixture and sliders allow the location pulley to be adjusted in the x and y directions such that is centered over the object.

Five object base sizes were measured: 40 mm, 60 mm, 80 mm, 100 mm, and 120 mm. The 40 mm plate allows the PBA to bend completely unconstrained when placed in the center of two elements on the mounting plates, while the 120 mm plate essentially constrains the two elements completely. For each base size, six different object heights were tested: 3 mm, 6 mm, 9 mm, 12 mm, 15 mm, and 18 mm. Objects were laser cut from 3 mm thick Acrylic, the height was increased by stacking additional plates.

For each trial, the tested object is placed in the desired location and the pulley is adjusted to be centered over the object. The PBAs are then inflated to 15 psi, gripping the object, and weights are then added to the other end of the line until the object is released. A camera tracks the displacement of a marker in the line, which is equal to the displacement of the object. This is repeated for each combination of array configuration and object size with a force vs. displacement curve being plotted for each.

Figure 7A:
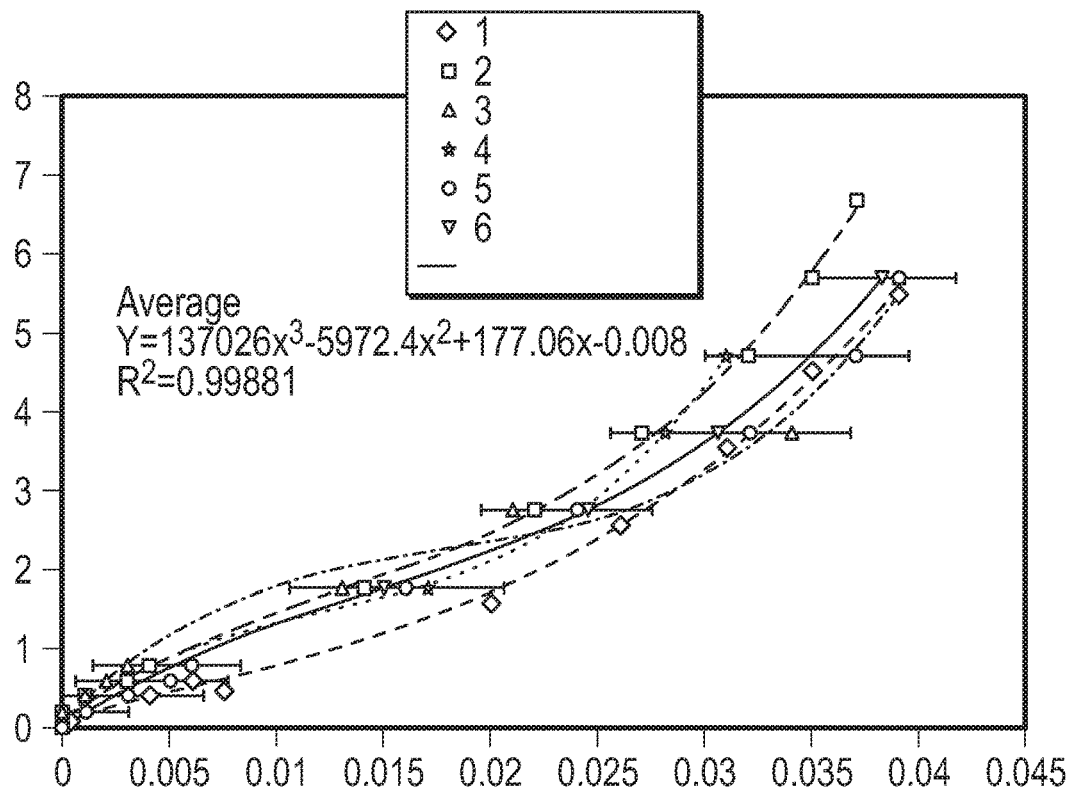
FIG. 7A illustrates a graph of displacement versus force applied to the plate of FIG. 6 with an array of the pneumatic bending actuators (PBAs), in accordance with an embodiment.
Figure 7B:
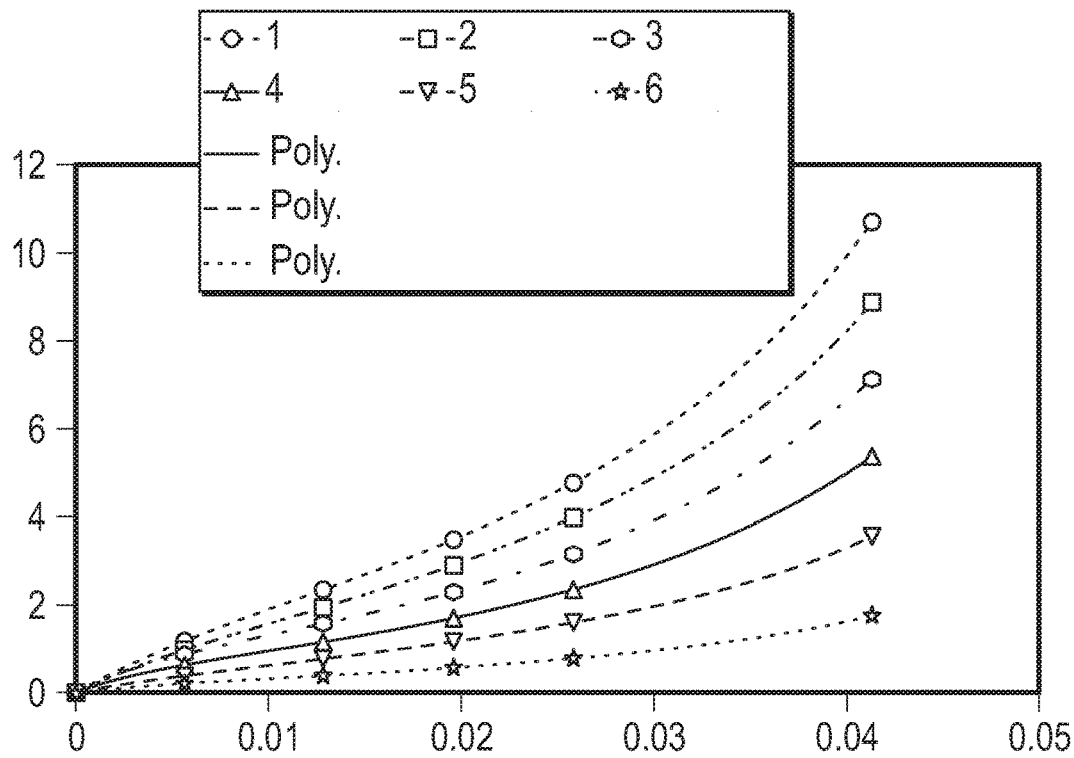
FIG. 7B illustrates a graph of displacement versus force applied to the fingers of an array of the pneumatic bending actuators (PBAs) in FIG. 6, in accordance with an embodiment.
Figure 7C:
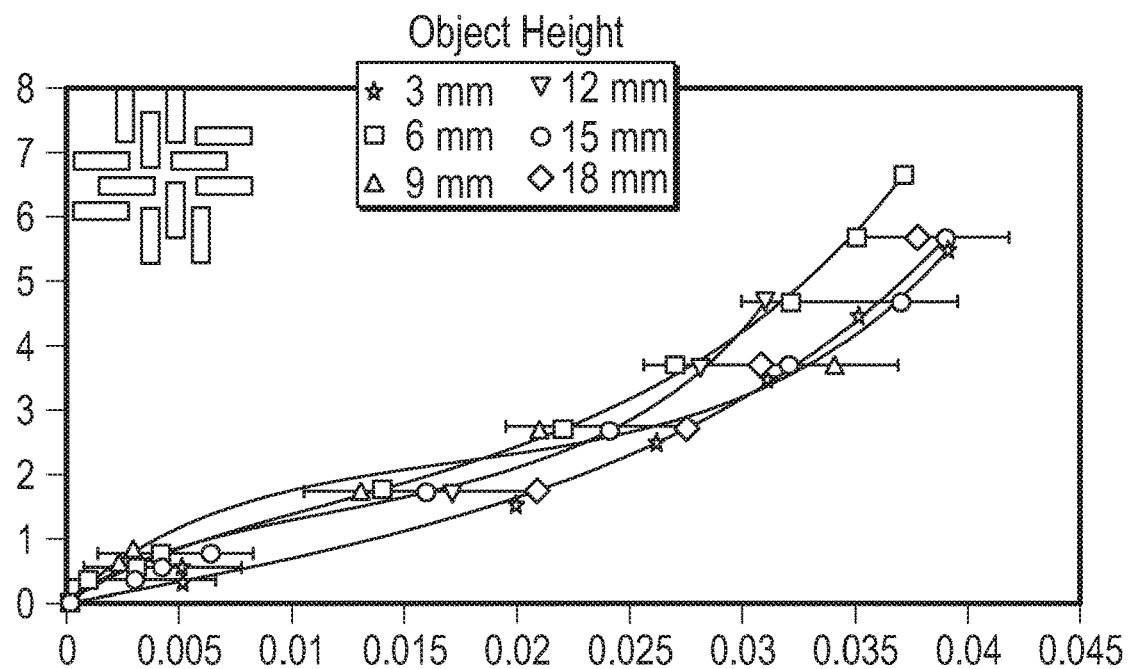
FIG. 7C illustrates a graph of an averaged force vs. displacement curve for Array 1 with a 40 mm object base at different object height in accordance with an embodiment.
Figure 7D:
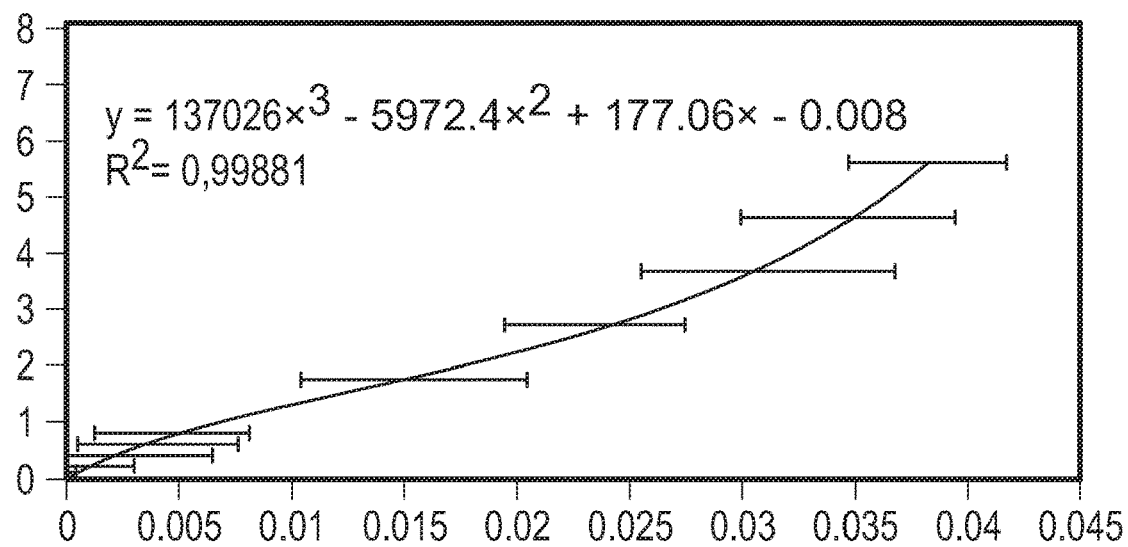
FIG. 7D illustrates a graph of the force vs. displacement curves for the 2-finger characterization with different object base sizes, in accordance with an embodiment.

FIG. 7A illustrates a graph of displacement versus force applied to the plate of FIG. 6 with an array of the pneumatic bending actuators (PBAs) in accordance with an embodiment. FIG. 7B illustrates a graph of displacement versus force applied to the fingers of an array of the pneumatic bending actuators (PBAs) in FIG. 6 in accordance with an embodiment. FIG. 7C illustrates a graph of an averaged force vs. displacement curve for Array 1 with a 40 mm object base at different object height in accordance with an embodiment. FIG. 7D illustrates a graph of the force vs. displacement curves for the 2-finger characterization with different object base sizes, in accordance with an embodiment.

In various exemplary embodiments, in FIGS. 7A-7D, after all 150 trials were performed and force vs. displacement curves were plotted for each, general trends were observed and analyzed. It is contemplated that the particular trials are exemplary in nature subject to particular configurations and should not be construed as limiting. That is, with different design configurations for each trial, a different set of results can and should be expected. In the FIGS. 7A-7D, the 2-finger configuration was analyzed in lieu of a single element, as at least two PBAs are preferred. The intent is to characterize the performance of a single element at each level of constraint and identify if the performance of larger arrays is equal to the sum of its parts. In FIG. 7A, the 2-finger configuration results as per the resulting plots, there was observed that the force vs. displacement is largely characterized by an S-curve for which a $3^{rd}$ order polynomial trend line seems to be a good fit. There is a small initial region of greater stiffness, followed by a region of greater elasticity, and then a final region where stiffness increases again until failure. The region of initial stiffness occurs when the PBAs are clamping down on the object, the more elastic region occurs as the 'fingers' are bent by the displacement, and their stiffness increases again as the PBAs approach their maximum displacement Based on these results, a predictive model may be created to estimate array performance for a specific object size; and therefrom to determine an optimal array configuration for a given object, which is particularly useful. From the 2-finger analysis, the curve may be determined for each level of constraint observed in our study. It is inferred from the plots of specific trials that the force required to achieve the same level of displacement scales linearly as additional PBAs are engaged.

In FIGS. 7A-7B the graph of the Force vs. Displacement curves can be used to develop the model. The left of FIGS. 7A-7B shows the curves for each level of constraint and right shows how the curves linearly scale. This means the curves in FIGS. 7A, 7B may be added together to create the predictive model for an array. For example, if an object is placed on an array such that six fingers will be engaged, with four 'fingers' constrained 18.6% and two fingers unconstrained, a simple model of this vertical holding performance is predicted by adding two 18.6% curves and one 0% curve (curves are based on 2 PBAs). This method was tested on the four characterized arrays and proved to be an accurate predictor.

The Force vs. Displacement curves in the graphs for each array with the predictive model curves overlaid is shown in FIG. 7C. One major observation from FIG. 7C is that, while object height acts as a limiting factor as to what objects could be held by a given array (i.e. once a certain base size and height was reached, the array could no longer reach the top surface of the object to grip it), a clear correlation between object height to force output is not present. In FIG. 7D, for the purposes of further analysis, these curves were assumed to collapse into each other within error bounds, and were thus averaged into a single curve, eliminating height as a variable for this study. The level of overlap seemed to be the main driving factor behind performance differences. Higher constrained PBAs were observed to have a smaller maximum displacement before yielding, however within this range they were stiffer overall.

Figure 7E:
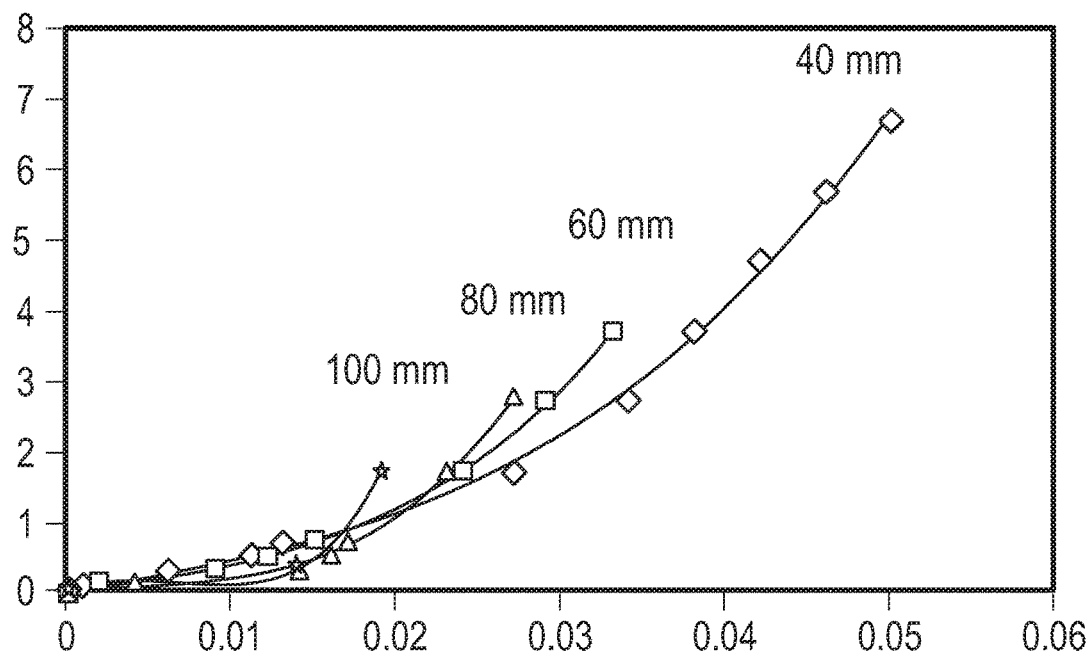
FIG. 7E illustrates a graph of the Force vs. Displacement curves for the 2-finger characterization with different object base sizes, in accordance with an embodiment.
Figure 7F:
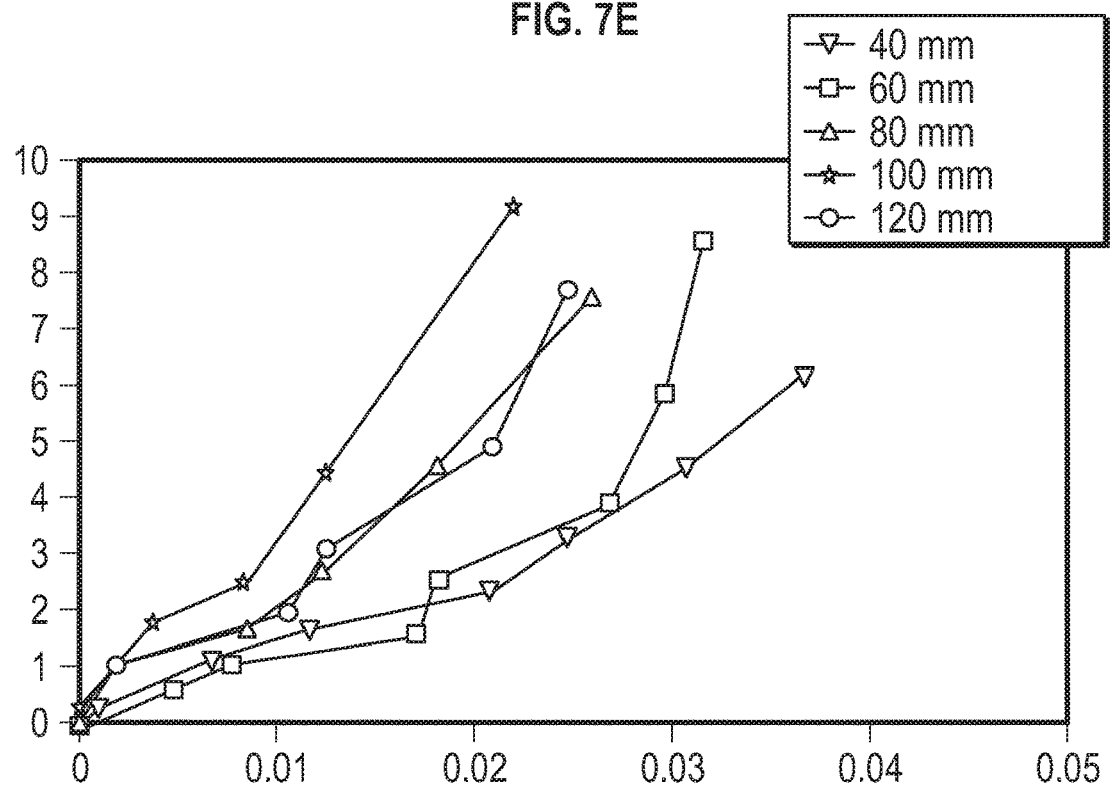
FIG. 7F illustrates a graph of the Force vs. Displacement curves for the array 1 of FIG. 4A in accordance with an embodiment.
Figure 7G:
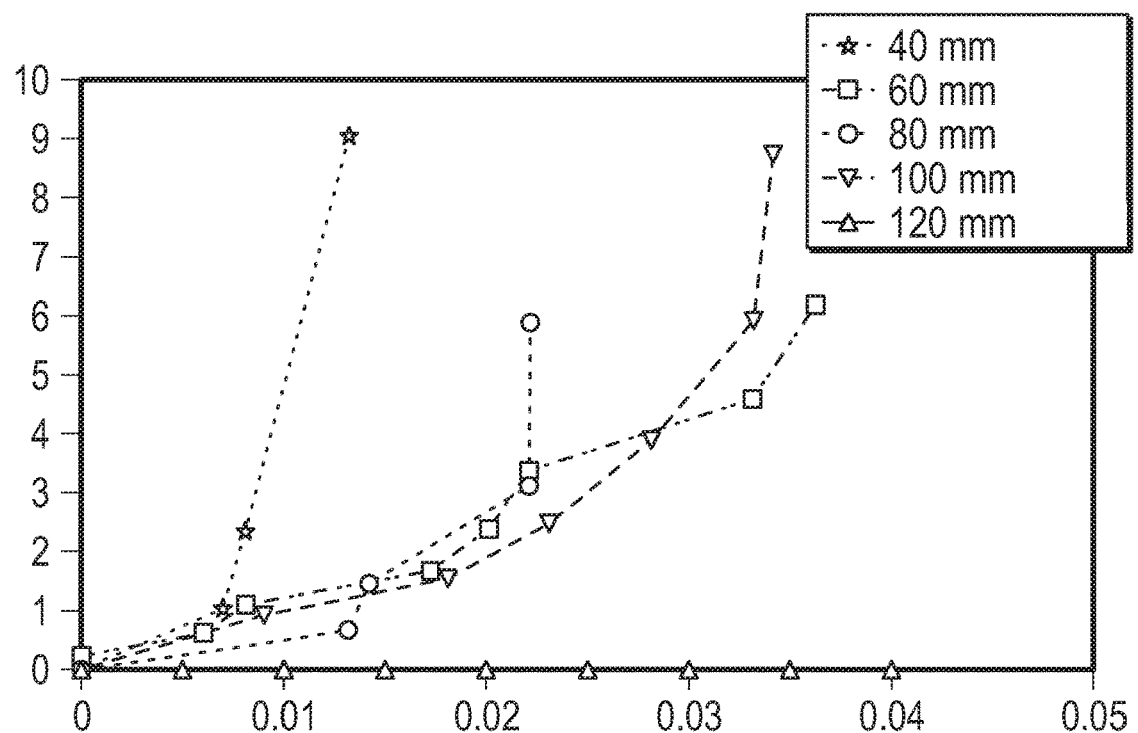
FIG. 7G illustrates a graph of the Force vs. Displacement curves for the array 2 of FIG. 4B in accordance with an embodiment.
Figure 7H:
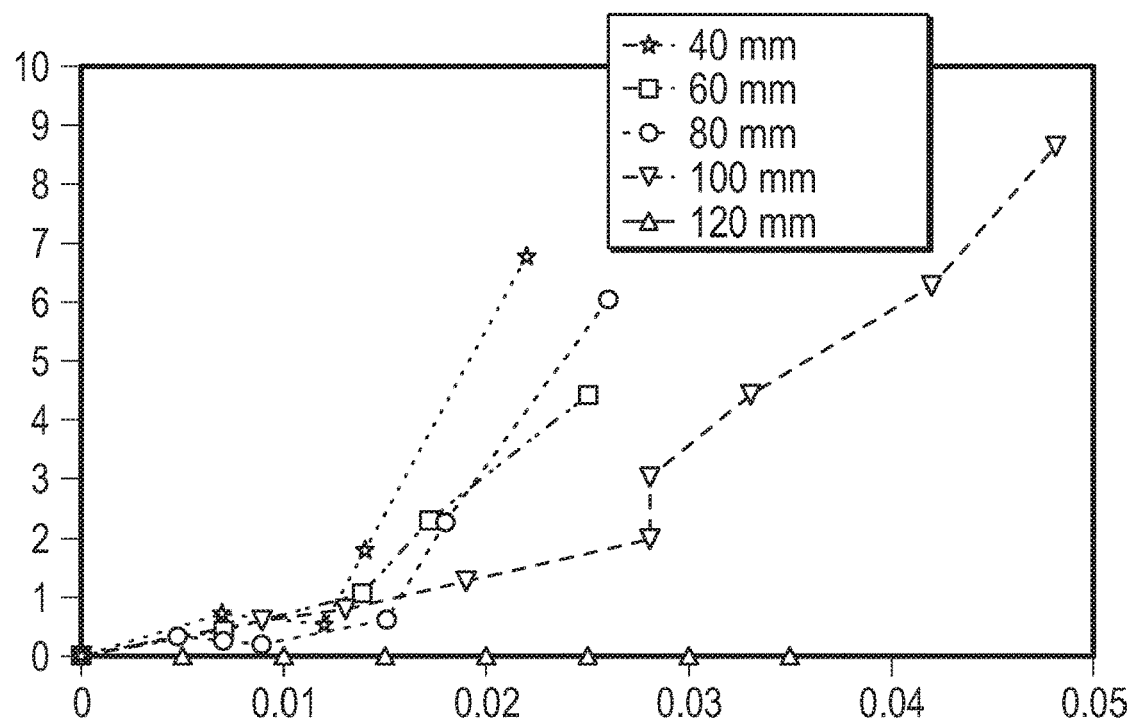
FIG. 7H illustrates a graph of the Force vs. Displacement curves for the array 3 of FIG. 4C in accordance with an embodiment.
Figure 7I:
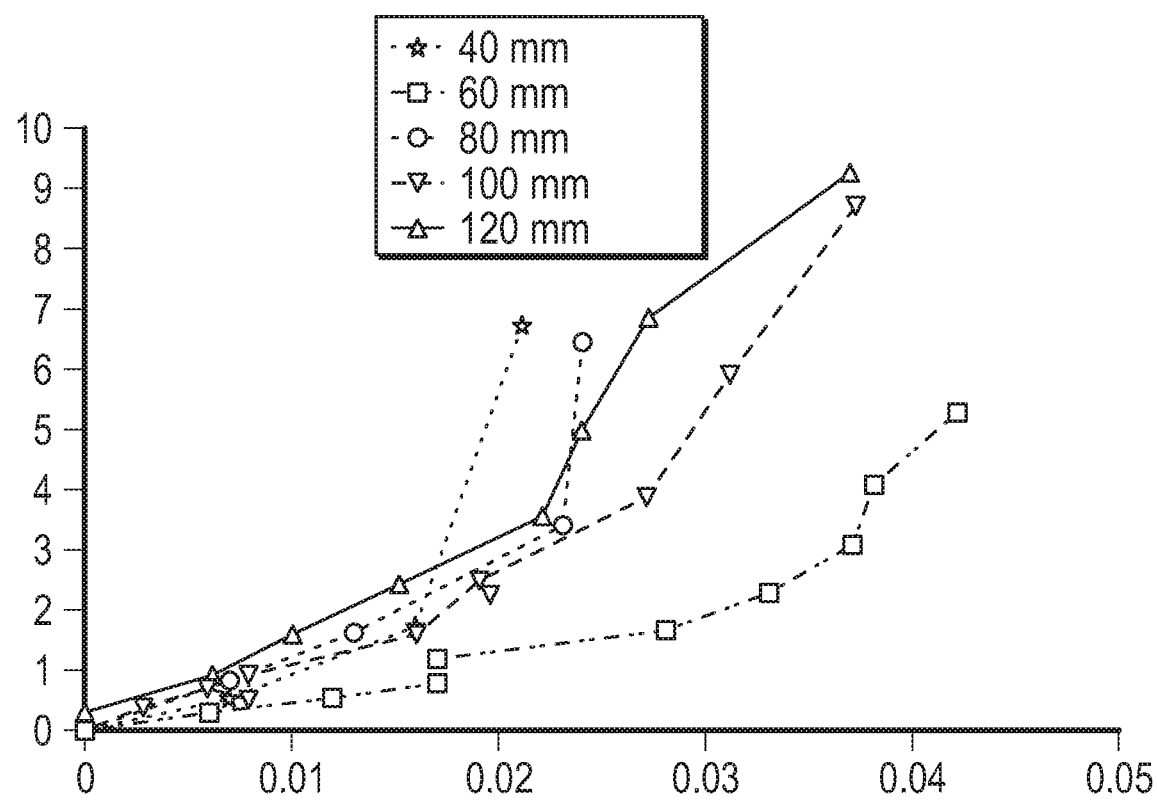
FIG. 7I illustrates a graph of the force vs. displacement curves for the array 4 of FIG. 4D in accordance with an embodiment.

FIG. 7E illustrates a graph of the Force vs. Displacement curves for the 2-finger characterization with different object base sizes, in accordance with an embodiment. FIG. 7F illustrates a graph of the Force vs. Displacement curves for the array 1 of FIG. 4A in accordance with an embodiment. FIG. 7G illustrates a graph of the Force vs. Displacement curves for the array 2 of FIG. 4B in accordance with an embodiment. FIG. 7H illustrates a graph of the Force vs. Displacement curves for the array 3 of FIG. 4C in accordance with an embodiment. FIG. 7I illustrates a graph of the force vs. displacement curves for the array 4 of FIG. 4D in accordance with an embodiment.

The array 2, exhibits the simplest configuration with uniform overlap, and is the only array (out of the array 1-4 designs) from graphs (FIGS. 7E-7I) that consistently became more stiff as the base size increased as shown in FIG. 7G. The array 2 and array 4 both could not grip onto the 120 mm base sized object (shown in FIGS. 7G and 7I), while Arrays 1 and 3 (shown in FIGS. 7F and 7H) where able to grip onto the 120 mm base sized object. Hence, if the object size has a base of 120 mm or greater, the design of array 1 and 3 is deemed a better design implementation for providing the enhanced gripping capabilities needed. Further conclusions can be deemed from FIGS. 7J and 7K.

Figure 7J:
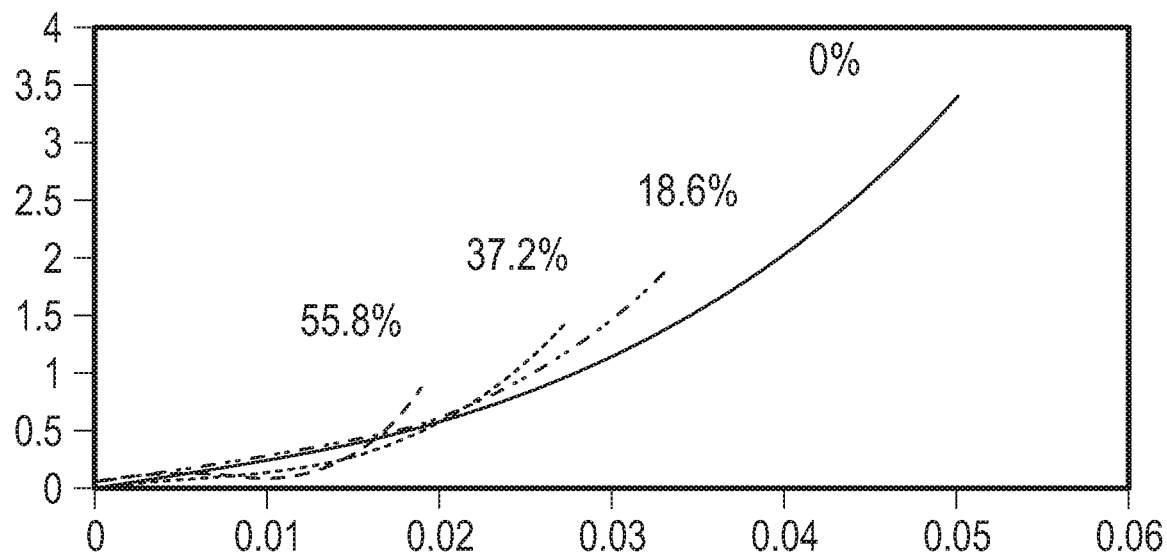
FIG. 7J illustrates a graph of a Force vs. Displacement curves used to develop the model of curves for each level of constraint, in accordance with an embodiment.
Figure 7K:
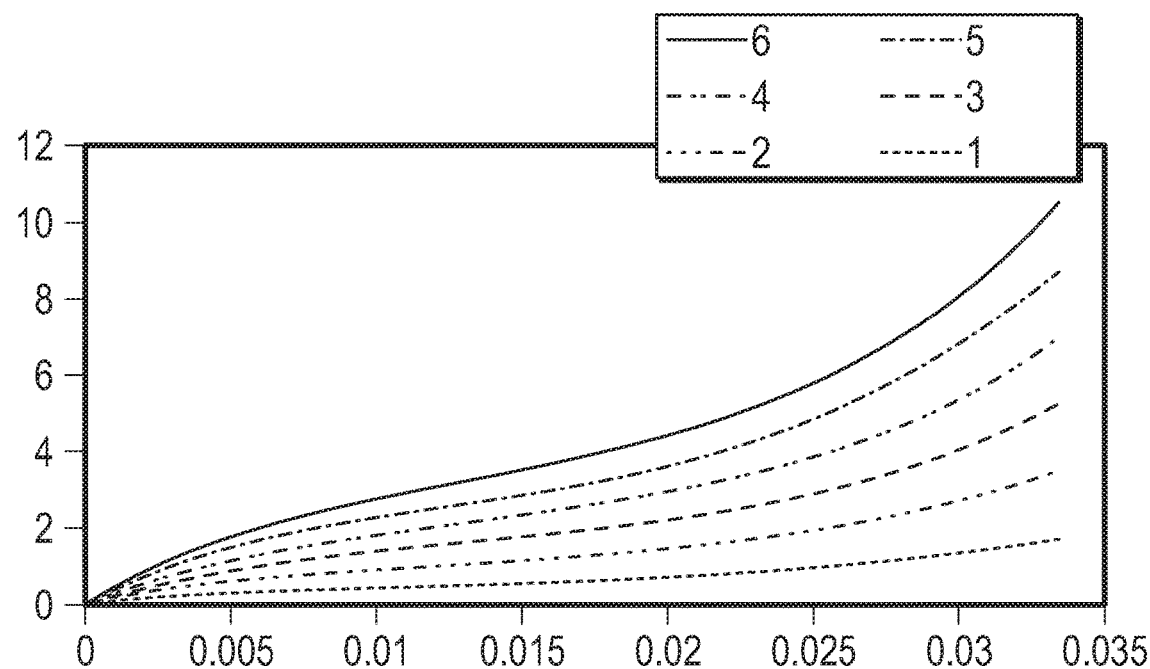
FIG. 7K illustrates a graph of a Force vs. Displacement curves used to develop the model of curves linearly scaled, in accordance with an embodiment.

FIG. 7J illustrates a graph of a Force vs. Displacement curves used to develop the model of curves for each level of constraint, in accordance with an embodiment. FIG. 7K illustrates a graph of a Force vs. Displacement curves used to develop the model of curves linearly scaled, in accordance with an embodiment. Based on the results shown in graphs 7J and 7K, a predictive model may be created to estimate array performance for a specific object size; and it can be surmised that there is an optimal array configuration for a given object which is particularly useful. From the 2-finger analysis in the graphs 7J and 7K, the curve for each level of constraint can be observed. It is inferred from plots of specific trials that the force required to achieve the same level of displacement scales linearly as additional PBAs are engaged (see FIG. 7K). This means that the curves may be added together to create the predictive model for an array. For example, if an object is placed on an array such that six fingers will be engaged, with four 'fingers' constrained 18.6% and two fingers unconstrained, a simple model of this vertical holding performance is predicted by adding two 18.6% curves and one 0% curve (curves are based on 2 PBAs). This method was tested on the four characterized arrays and proved to be an accurate predictor.

Figure 7L:
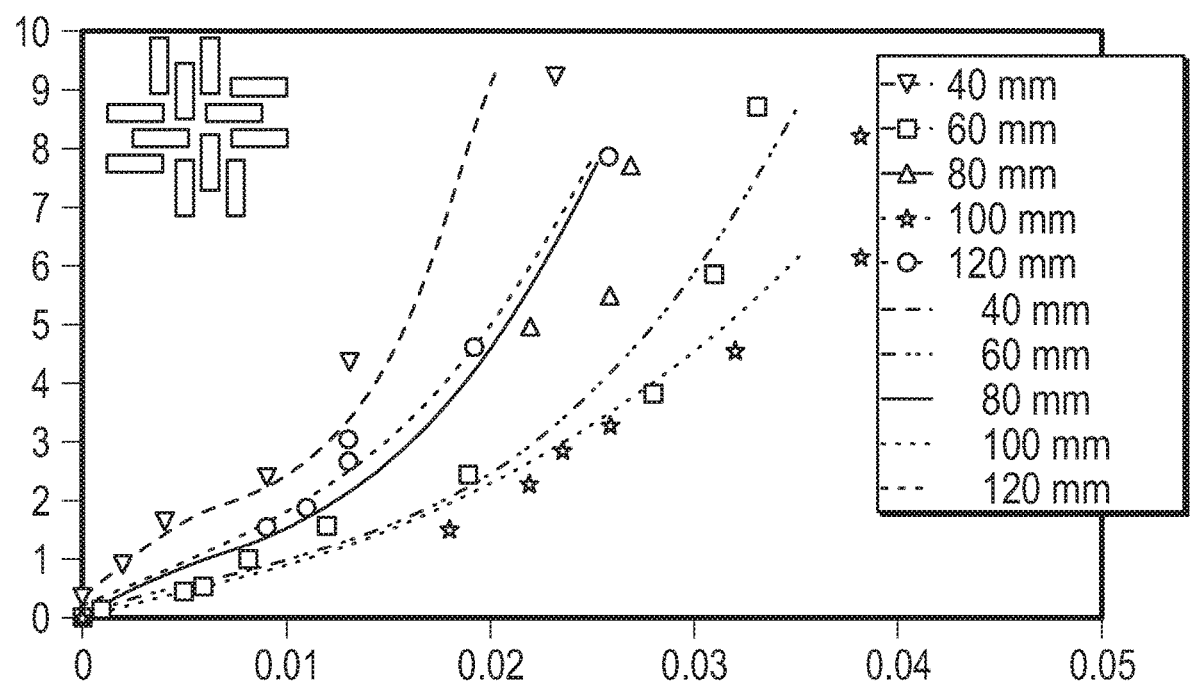
FIG. 7L illustrates a graph of the Force vs. Displacement curves for the array 1 of FIG. 4A with the predictive model curves overlaid in accordance with an embodiment.
Figure 7M:
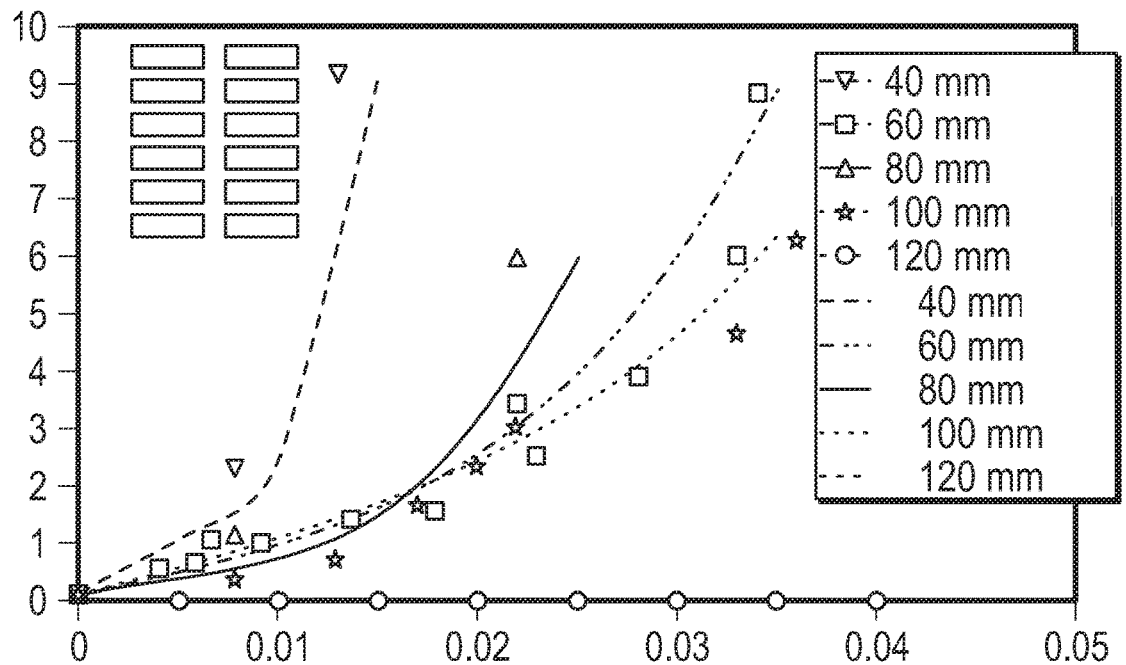
FIG. 7M illustrates a graph of the Force vs. Displacement curves for constrains for the array 2 with the predictive model curves overlaid of FIG. 4B in accordance with an embodiment.
Figure 7N:
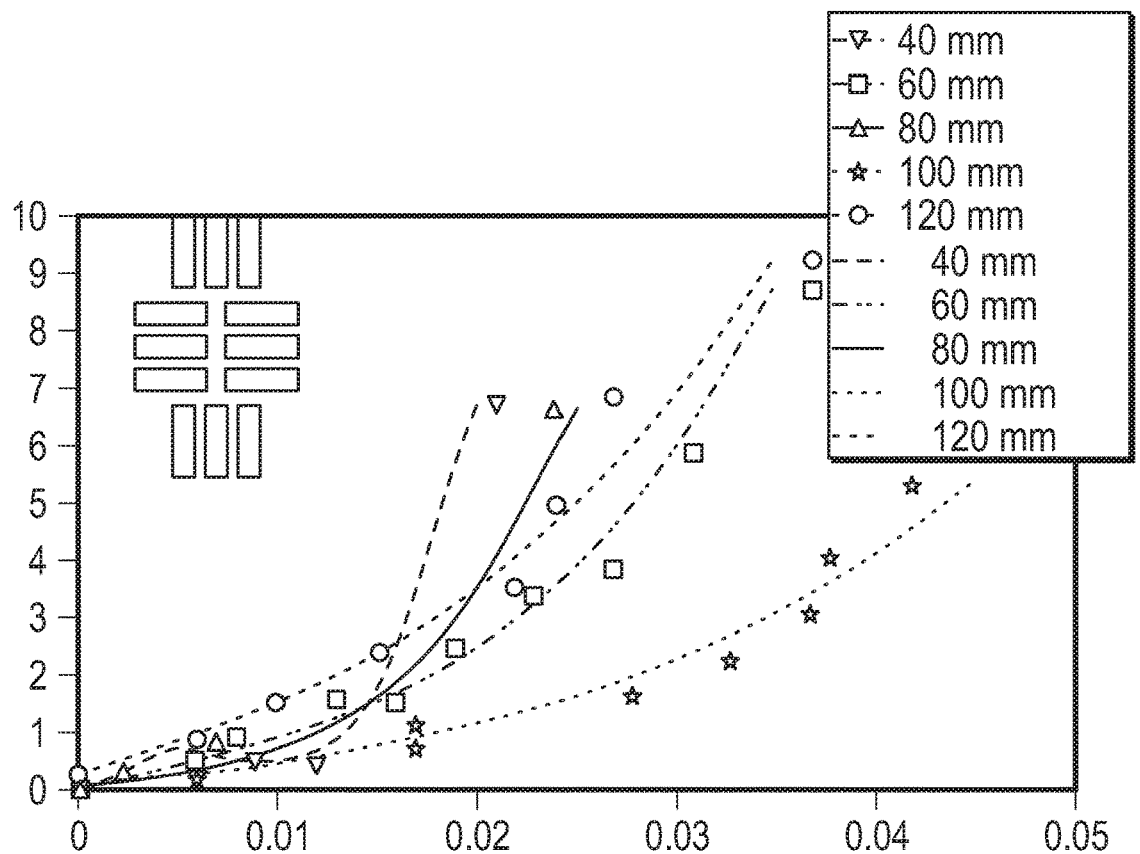
FIG. 7N illustrates a graph of the Force vs. Displacement curves for constraints of the array 3 with the predictive model curves overlaid of FIG. 4C in accordance with an embodiment.
Figure 7O:
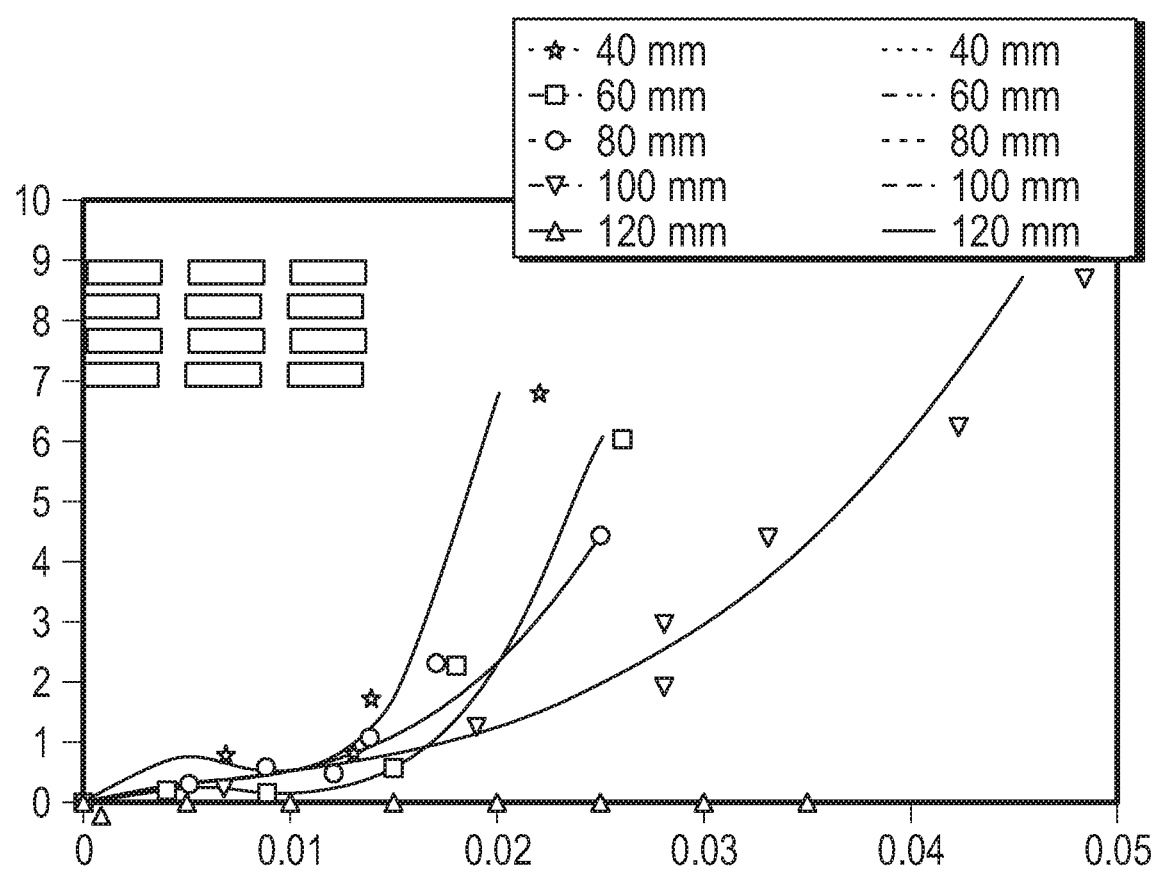
FIG. 7O illustrates a graph of the force vs. displacement curves for the array 4 with the predictive model curves overlaid of FIG. 4D in accordance with an embodiment.

FIG. 7L illustrates a graph of the Force vs. Displacement curves for the array 1 of FIG. 4A with the predictive model curves overlaid in accordance with an embodiment. FIG. 7M illustrates a graph of the Force vs. Displacement curves for constraints for the array 2 with the predictive model curves overlaid of FIG. 4B in accordance with an embodiment. FIG. 7N illustrates a graph of the Force vs. Displacement curves for constraints of the array 3 with the predictive model curves overlaid of FIG. 4C in accordance with an embodiment. FIG. 7O illustrates a graph of the force vs. displacement curves for the array 4 with the predictive model curves overlaid of FIG. 4D in accordance with an embodiment.

While this model of graphs 7L-7O may not account for all the dynamics within larger array structures, they present a useful reference in designing configurations of arrays and predicting their performance. In various embodiments, this practice may also be used to develop an array with specific properties. PBAs with different levels of constraint act stiffer at different levels of vertical displacement, so this knowledge may be used to specifically stagger the PBAs such that this stiff region occurs at a desired range of displacements.

In various embodiments, depending on the level of constraint and height of the object, the PBA is concealed on the outward face of the object, which in the case of smart devices would be the screen. This could potentially be mitigated by configuring the array in such a manner that concealment is minimized, but this may inherently have an effect on the holding performance as well and may also result in the independence of the attachment to the object attached during design implementation stages.

Figure 8A:
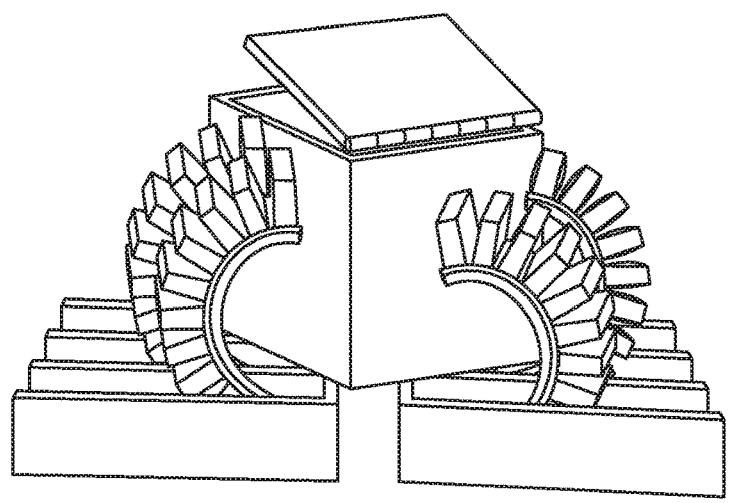
FIG. 8A illustrates a box in a non-aligned mount using the pneumatic bending actuator (PBA), in accordance with an embodiment.
Figure 8B:
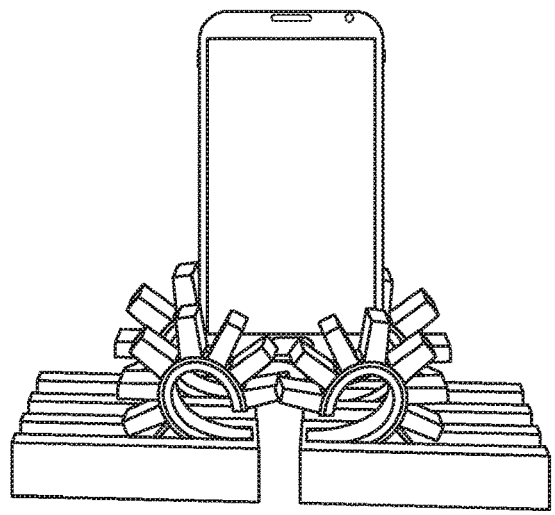
FIG. 8B illustrates a smart phone in a mount using the pneumatic bending actuator (PBA), in accordance with an embodiment.
Figure 8C:
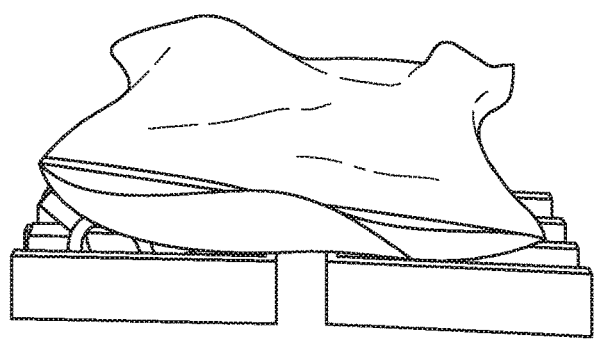
FIG. 8C illustrates a bag of chip in a non-rigid grip using the pneumatic bending actuator (PBA), in accordance with an embodiment.

FIG. 8A illustrates a box in a non-aligned mount using the pneumatic bending actuator (PBA). The box is restraint in an off center or parallel position and the position of the box can be manipulated to enable a range of positions in clockwise or counter-clockwise directions as desired. FIG. 8B illustrates a smart phone in a mount using the pneumatic bending actuator (PBA). The smart phone while depicted in a perpendicular position can be change to a horizontal position (or slanted or other position) and still be restraint by the PBAs in whole or in part. FIG. 8C illustrates a bag of chip in a non-rigid grip using the pneumatic bending actuator (PBA). The chip of chip rather than gripped by the PBAs is supported by PBAs by part of the PBA only partially released from a constraint position. In various exemplary embodiment, the PBAs can provide a support surface to restrain fragile objects likely to be deformed by a gripping action of the PBA.

Figure 9A:
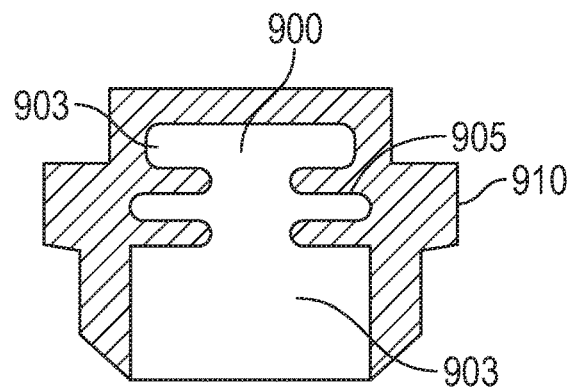
FIG. 9A illustrates an PBA type device with self-limiting capability in accordance with an embodiment.
Figure 9B:
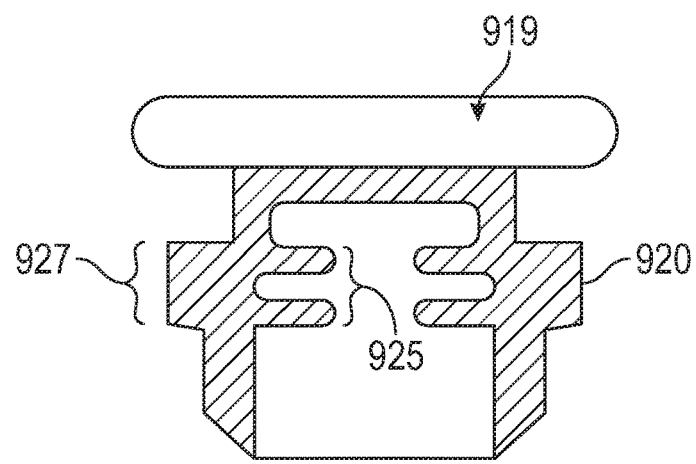
FIG. 9B illustrates a PBA type device with self-limiting capability with an object, in accordance with an embodiment.
Figure 9C:
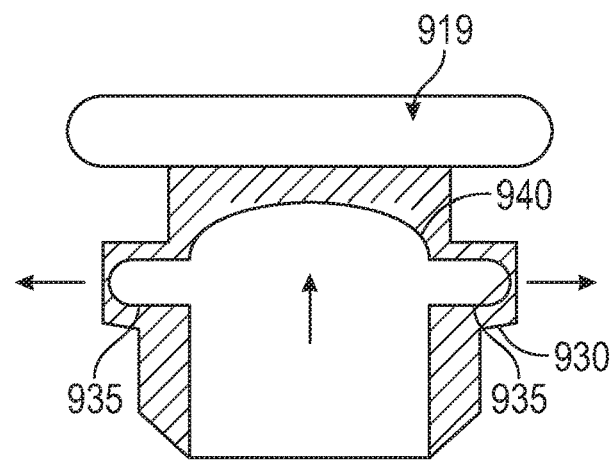
FIG. 9C illustrates a PBA type device with no pop up with a self-limiting capability in accordance with an embodiment.

FIG. 9A illustrates an pneumatic actuator (PA) type pop-up device with self-limiting capability in accordance with an embodiment. FIG. 9B illustrates a PA pop-up device with self-limiting capability with an object, in accordance with an embodiment. FIG. 9C illustrates a PA device with no pop up with a self-limiting capability in accordance with an embodiment. For purposes of the disclosure, a pneumatic actuator is defined or considered to include or be inclusive of PBA devices or the like. In FIG. 9A an alternate exemplary embodiment of a deployment and constraint design configuration for a pneumatic actuator (PA) which in a pop up (i.e. perpendicular direction) action protrudes out from a surface floor (rather than protruding out in a curl out action, as is the case with a PBA device) where part of or all of the PA protrudes above the surface floor in manner to hold, support, or grip an object above the surface. The PA pop-up device 900 with a chamber 903 is shown configured where the design configuration of the PA type pop-up device 900 enables both an upward (i.e. perpendicular or nearly perpendicular direction in relation to the surface) deployment as well as expansion of a middle part 905 of the PA pop-up device 900. The middle part of the pop-up is designed to provide the same self-limiting function (transverse expansion) as the flaring in the PBA embodiment. The PA pop-up device 900 nominally reside within a field of a trench 910 embedded into surface (ex. in a trench 900 such as a cargo trench or like integrated at the surface for containing the PA pop-up device 900. When in use (FIG. 9B), the object 919 will block some of the PA pop-up devices 900 configured at the surface. As the pop-ups are inflated, they will begin to deploy upward as the chamber 903 is inflated. Those PA pop-up devices 900 blocked from deployment as in FIG. 9B will have the upward deployment limited by the object and instead cause the middle part 925 of the pop-up to inflate in a transverse direction. Each of the pop-up trenches 920 include a lip part 927 which will mate (i.e. form a male-female coupling) the inflated middle part 925 of the chamber 903 to the lip part 927.

FIG. 9C in another exemplary embodiment that depicts a final blocked state, where the middle part 935 of the chamber has extended in the transverse direction, engaging the trench lip part 930 (i.e. forming a male-female coupling between the middle part 935 of the PA pop-up device 940 and the trench) and limiting the blocked PA pop-up device 940 from any further upward expansion (and also providing horizontal constraint to the PA pop-up device 940) with additional inflation. The middle part 935 of the PA pop-up device 940 is expanded so that the middle part 935 underlies or fits into the slot of the lip part 935 to secure the PBA pop-up device 940 to the lipped trench thereby providing traversal constraint by the male-female coupling of the middle part 835 and the lip part 935. These blocked and self-locked pop-ups will not jostle, tip or move the constrained object.

In various exemplary embodiments in the pop-up cargo/object retention devices, the PA pop-up devices 940 are partially deployed so chamber 903 in FIG. 9A is proud of the trench 910. When the object 919 is placed upon the pop-ups the force from the weight of the object compresses the pop-up enough that the middle part 925 of the pop up deploys in a transverse direction. This engages the protruding middle parts 935 of the chamber with the locking trench features 930. Further inflation only locks the limited pop-down more securely. In another variation, the pop-ups 900 are nominally deployed out of their trenches 910, and the object 919 forces the pop-ups down into the trenches with the chamber 903 compressing and reliving the increased pressure by initiating extension of the middle part 905 of the pop-up. The result is the self-constrained chamber 903 of the PA pop-up device 940 depicted in FIG. 9C.

In various exemplary embodiments, the PA pop-up devices 940 operate in a similar manner to the PBA embodiments by: (1) placing an object placed on a field of the PA pop-up devices 940; inflating each PA pop-up device 940; and (2) enabling only PA pop-up devices surrounding the placed object to deploy and thereby locating the object and identifying a shape configuration at the edges of the object with the field; (3) not deploying the PA pop-up devices 940 below the object by virtue of a blockage caused by the undersurface (i.e. the object) of the placed object, and enabling the extending of the constraining features on the PA pop-up device 940 that is constrained or locked in the trench; and that lock into trench features; and (4) extending the constraining features (i.e. parts of the PA pop-device not release in the entirety) of the PA pop-up devices 940 that did to release or pop up by virtue of their position to act as additional retention features for hold the object.

Figure 10:
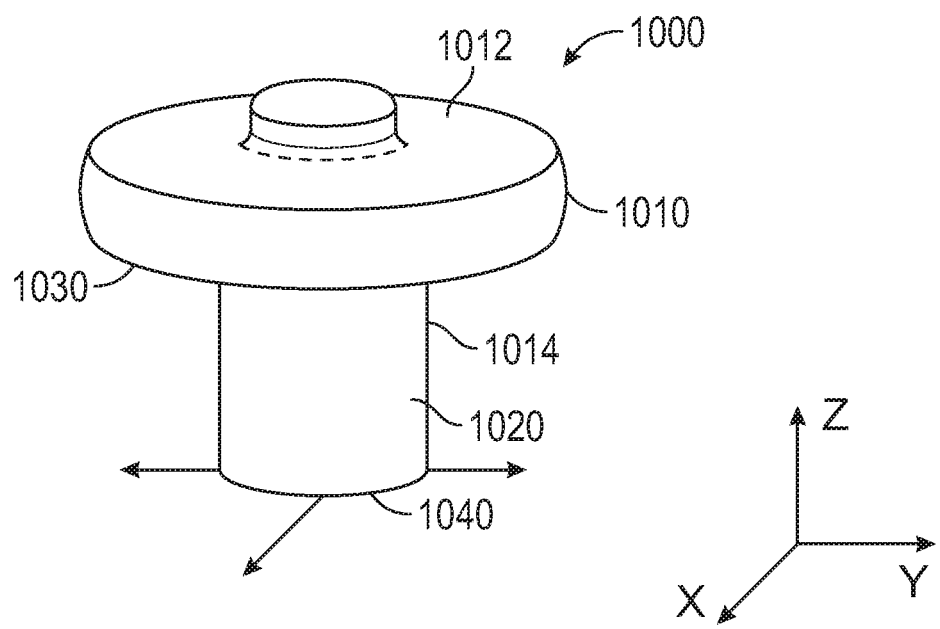
FIG. 10 illustrates a pneumatic pop-up actuator for holding or restraining an object at the surface of the trench in accordance with an embodiment.

FIG. 10 illustrates a pneumatic pop-up actuator for holding or restraining an object at the surface of the trench (can you show the trench with a ref. No. ?) in accordance with an embodiment. In FIG. 10, a pop-up actuator 1000 includes a mushroom head 1010 which includes side portions 1012 that extend from the body region 1014 that serve to hold or support an object (not shown). The mushroom head 1010 includes an elastic region 1030 that is more flexible and that allows for expansion under the pressure of air in a cavity (not shown) in the pop-up actuator 1000 where the elastic region can expand further and can be configured or re-reconfigured to be inserted into a lip of a trench in a non-popped up state and released when proceeding to the popped up state.

Figure 11:
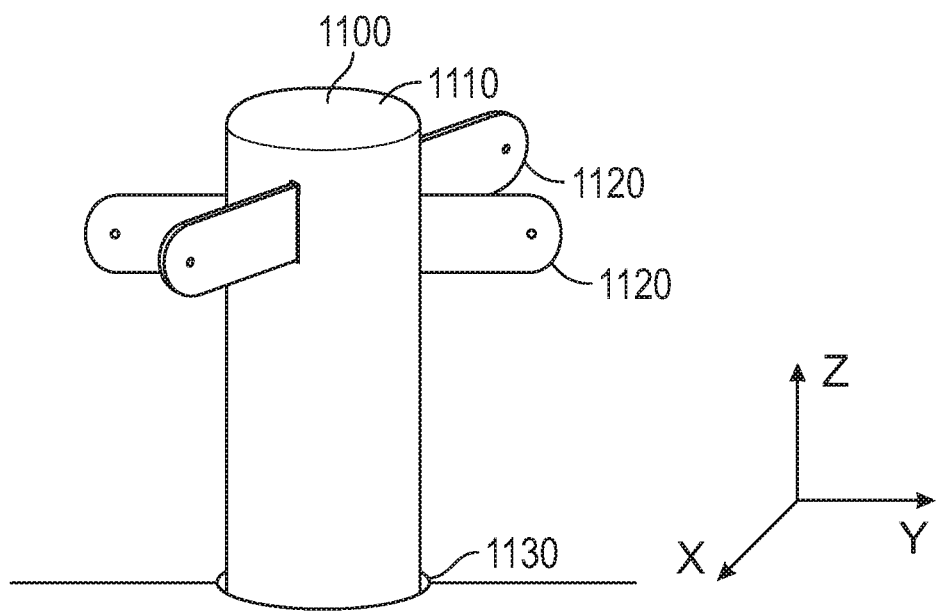
FIG. 11 illustrates a pneumatic pop-up actuator for holding or restraining an abject at the surface of the trench in accordance with an embodiment.

FIG. 11 illustrates a pneumatic pop-up actuator for holding or restraining an object at the surface of the trench in accordance with an embodiment. In FIG. 11, a pop-up pneumatic actuator 1110 includes a main bump 1100 (i.e. the body of the pop-up pneumatic actuator) with minor bumps 1120 (i.e. sides of the pop-up pneumatic actuator) that protrude from the body and extend in a manner that enable the pneumatic actuator 1110 to hold, support or grip an object (not shown) affixed or positioned one of the minor bumps 1120. The minor bumps 1120 can be extended in length to provide more support or greater gripping of an object. While the minor bumps 1120 appear depicted as flat in FIG. 11, alternate exemplary embodiments of the minor bumps 1120 can be used and configured and include: volumetric or finger like constructs of the minor bumps 1120 acting in a similar manner to provide more support or exerting greater gripping force or holds to the object.

Figure 12:
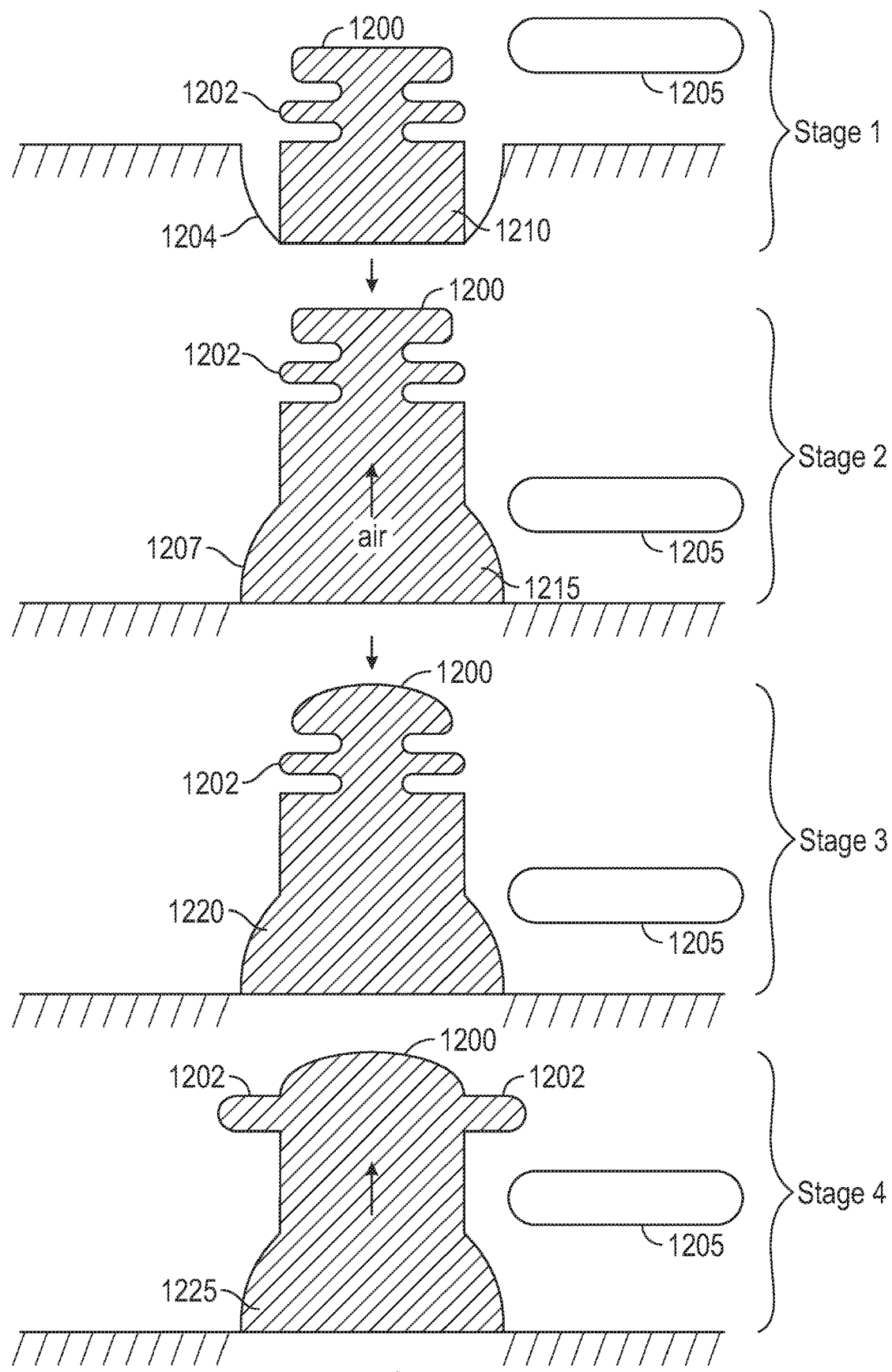
FIG. 12 illustrates a pneumatic pop-up actuator in various retention stages in accordance with an embodiment.

FIG. 12 illustrates a pneumatic pop-up actuator in various retention stages in accordance with an embodiment. In FIG. 12 the action of unconstrained pop-up devices is described, in stage 1, the pop-up PA 1200 is in a non-popped state with the wings 1202 (i.e. sides) not protruding from the body 1210 and the pop-up PA 1200 flush with the surface by being in a non-popped up state in the trench 1204. In stage 2, compressed air enters the body 1215 of the pop-up PA 1200. The pop-up PA 1200 is deploy from the trench 1204; that is the pop-up PA 1200 due to the perpendicular forces exerted by the pressure of the compressed air, is displaced in an upward direction where the body 1215 protrudes from the surface by an amount 1207. In the popped up state, the pop-up PA 1200 can provide lateral support to the object 1205. In stage 3, the compressed air is not received by the body 1220 and the pop-up PA 1200 maintains it position and rests on the surface protruding from the surface. In other words, the pop-up PA 1200 stays in a popped up state which is static and supports the object 1205. In stage 4, additional compressed air pressure is received and the wings 1202 of the pop-up PA 1200 respond to the added air pressure to expand in the horizontal direction to hold the object 1205 under a protruded area of the wing 1202 from the body 1225. That is, the object 1205 is restraint by an under portion of the wing 1202 that clamps the object 1205 to the surface which the body 1225 rests on. The object 1205 is sandwiched between the wing 1202 and the surface in a manner that enables the pop-up PA 1200 to grip or clamp the object 1205.

In various exemplary embodiments, the size and details of each pop-up PA will be related to the relative size of an object (i.e. cargo) which is intended for restraint. With pop-up PAs ranging in size from 5 mm to 25 mm in diameter and an array spacing of 5 mm to 150 mm between each pop-up PA for use in restraining objects than include: small sundries like keys, pens and pencils, cell phones/small electronics, cups and mugs, etc. for surfaces located within the surface (ex. the surface of a vehicle interior; or for bulkier cargo that may be hauled within a pickup truck bed), the pop-up PA could range in diameter from 50 mm to 200 mm arrayed 50 mm to 800 mm apart. Within these two scaler extremes there are trends in sizing that become tied to the geometry of the pop-up PA and the array in which it is configured. In general, the final deployed height of the pop-up PA can range from 75% of the pop-up diameter to 500% of its diameter. Additionally, the out-of-plane displacement of a pop-up PA will be limited by the trench depth, ranging from 0.5 to 5 times the trench depth. Increased out-of-plane extension capabilities drive the diameter of the pop-up PA towards its upper bound because of the additional material needed to accommodate the extension. The self-limiting features of the pop-up PA chamber and trench will be dictated by array spacing, with extensions ranging from 10% to 200% of the distance between adjacent pop-up devices and trenches nominally equal to or less extensive than the interfacing extension. Secondary bump/restraining features are limited in their extension capabilities from 10% to 200% of the base pop-up PA chamber diameter. This is due to geometric factors limiting the amount of material packable in or around the main chamber which can be allotted to these features; as well as the extensibility of the material comprising the chamber.

Figure 13:
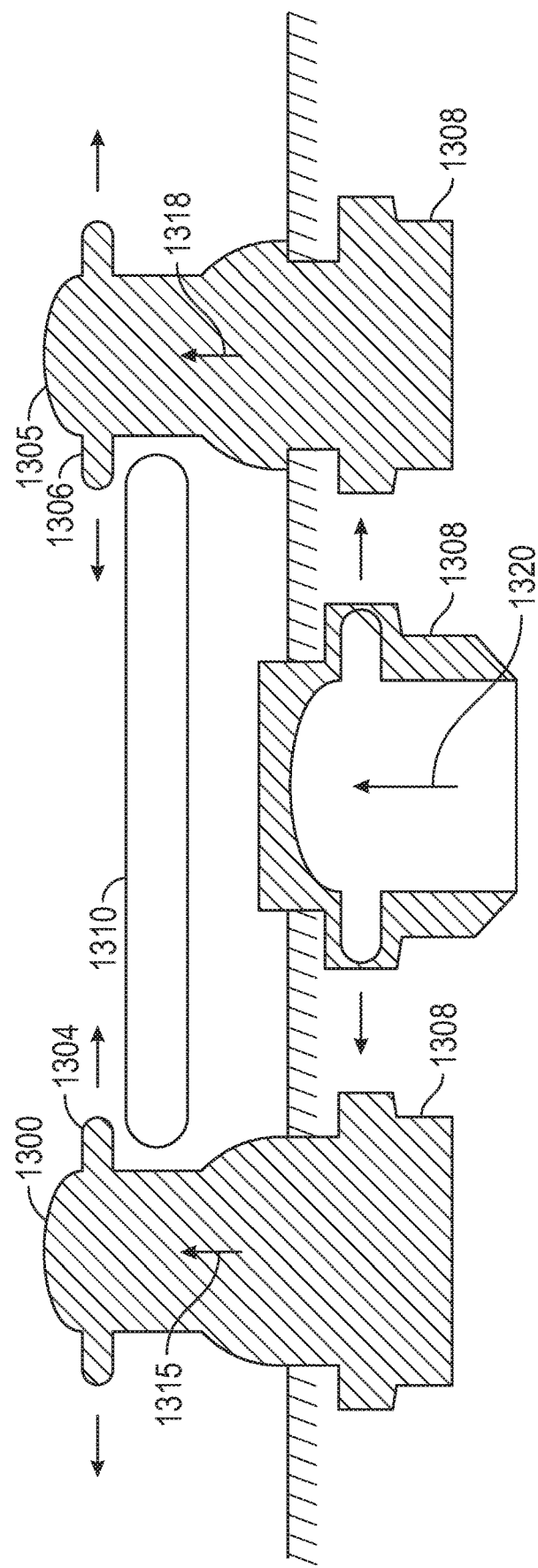
FIG. 13 illustrates a set of pneumatic pop-up actuators in accordance with an embodiment.

FIG. 13 illustrates a set of pneumatic pop-up actuators in accordance with an embodiment. In FIG. 13, the object 1310 is restrained, supported and held between and by the pop-up PA 1315 and the pop-up PA 1305. Because of the size of the object, the pop-up PA 1320 must remain constrained in the trunk 1308 and in a non-popped state. While the pop-up PA 1315 and the pop-up PA 1305 are both in the popped-up state. The wings 1304 and 1306 of each of the pop-up PAs 1315, 1305 respectively protrude from the bodies 1315, 1318 respectively in a horizontal manner to hold the object 1310 to the surface. By keeping certain pop-up PAs in a non-popped state, and certain pop-up pneumatic actuators in a popped state; objects of different sizes can be held or restraint by different combinations of popped up and non-popped up PAs. As in the non-popped up state, the pop-up PA does not act as an obstacle or impediment to an object 1310 that covers the pop-up PA. In this way, in larger objects that cover a surface area covering any number of pop-up PA can be accommodated. In an exemplary embodiment, the pop-up pneumatic actuators 1300 and the pop-up PA 1320 and the trenches 1308 are identical in structure and operation except that the pop-up PA 1320 is not deployed, and constrained in the trench 1308; while the pop-up PA 1300 is deployed (i.e. each pop-up pneumatic actuator is of the same structure but is in one of two different states of a popped up state or a non-popped up state).

Figure 14:
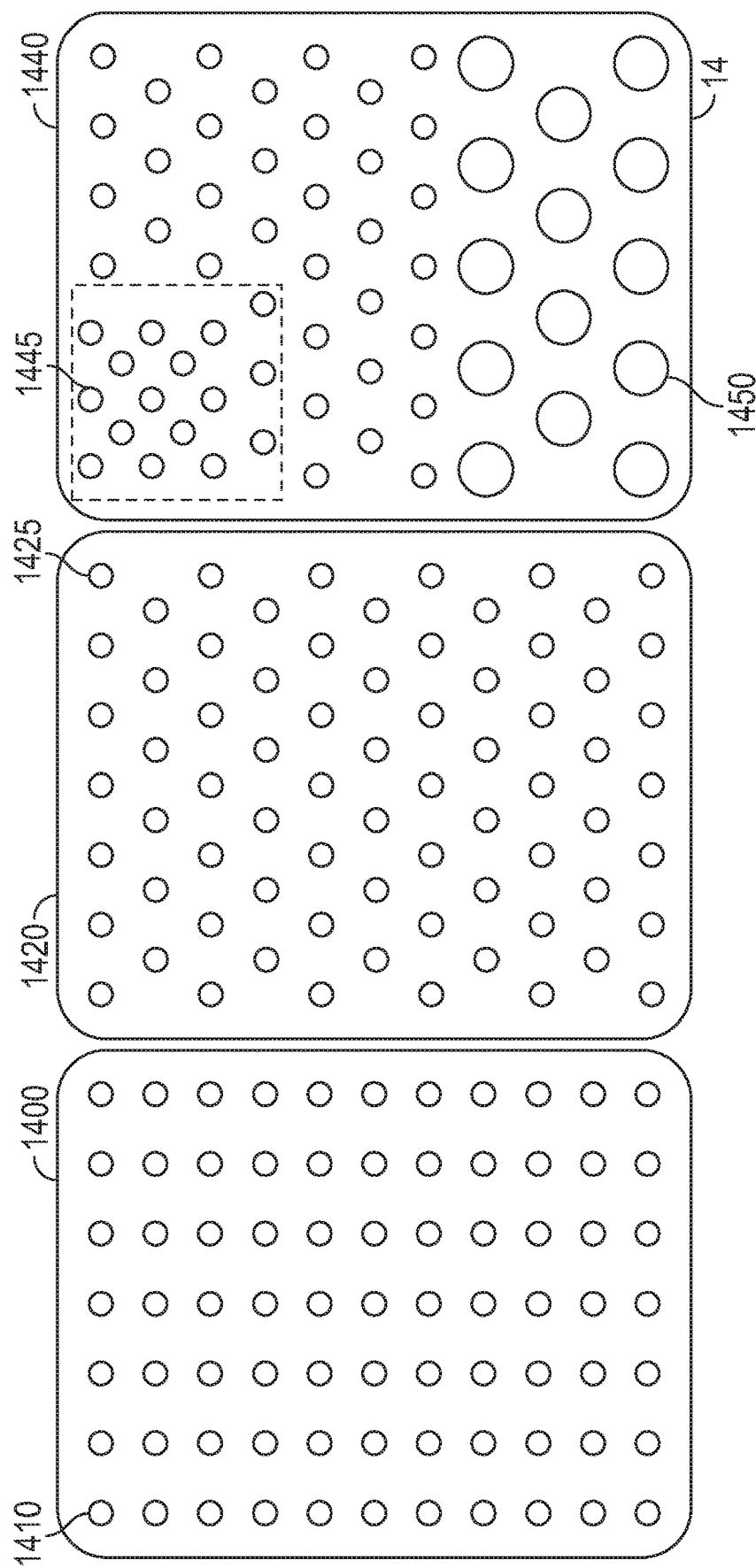
FIGS. 14A, 14B and 14C illustrate different array configurations of the pop-up pneumatic actuators, in accordance with an embodiment.

FIGS. 14A, 14B and 14C illustrate different array configurations of the pop-up pneumatic actuators, in accordance with an embodiment. In FIG. 14A, the array 1410 contains a set of pop-up pneumatic actuators 1400 configured in a uniform pattern on a surface. In FIG. 14B, the array 1420 contains a set of pop-up pneumatic actuators 1425 in a non-uniform diagonal pattern. In FIG. 14C, the array 1460 contains pop-up pneumatic actuators 1440 of multiple patterns, and different sizes, for example pop-up pneumatic actuator 1450 of a larger size than the pop-up pneumatic actuator 1440. It is contemplated that the array 1460 can contain different patterns 1445 of pop-up pneumatic actuators 1440 and further the particular patterns of pop-up pneumatic actuators should not be construed as limiting but are configurable in a multitude of arrangements as desired.

Figure 15:
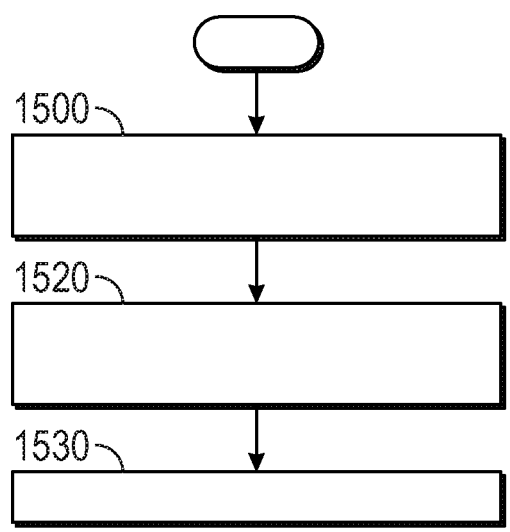
FIG. 15 is a flowchart of the object restraint process in accordance with an embodiment.

FIG. 15 illustrates a flowchart of the use of the PBA for restraining an object placed at the surface of the trench in accordance with an embodiment. While the flowchart is depicted for a PBA, steps or similar steps depicted have applicability to pop-up PAs or the like.

In FIG. 15, in task 1500, a set of PBAs of an array are positioned in a manner to receive an object where a part of the PBA is constrained within a trench in the array and a part of the PBA is not constrained in the PBA in the array. The part of the PBA remains flat to the surface of the trench and the part of the PBA protrudes in a curved segment like a curved finger in varying degrees of curvature. At task 1520, an object is placed on the surface at a location within one or more of the PBAs in a manner that the curved segment grips or clamps the object. That is, the part of the PBAs wraps around each the object to restrain and hold the object. The part of the PBAs clamps or holds the object to the surface. The shape of the object is irrelevant as each PBA distorts to accommodate different shapes while maintaining a clamping affect to the object. The curvature of each curved segment may be adjusted by the amount of air that is compressed into each chamber of the curved section. The more compressed air in each chamber, the greater the expansion of the PBA on the side that is not constrained by an inextensible layer and therefore is unconstrained and can expand to accommodate the pressure of lateral forces of the compressed air. At task 1530, while holding the object, the part of the PBA is held within the trench because the chambers that make up the part of the PBA expand because of the compressed air with in the chamber (i.e. the air is in a cavity in each chamber) and are restrained by a lock mechanism that divides part of the PBA into the constrained and unconstrained parts and also with a lip in the trench hold the part of the PBA flat and constraint in the trench.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof

What is claimed is:

1. An object restraint system for clamping an object to a surface comprising:
    a trench;
    a pneumatic bending actuator (PBA), the PBA and the trench configured on the surface for enabling a clamping of the object to the surface;
    a part of the PBA constrained in the trench and a part of the PBA left unconstrained by the trench, wherein the constrained part is configured as flat on the surface and the unconstrained part is configured as a curved segment protruding from the surface wherein the part constrained is determined in part by a weight of the object clamped on the surface;
    a primary actuation mechanism for constraining in the trench the constrained part of the PBA to remain flat at the surface for resting the object on the surface, and for leaving the unconstrained part of the PBA configured as the curved segment to exert a clamping force to the object on the surface and for clamping the object to the surface; and
    a secondary constraint mechanism to retain the constrained part of the PBA in the trench to prevent a portion of the constrained part of the PBA from exerting an upward force counter to the clamping by the curved segment of the unconstrained part of the PBA on the object, and to ensure that an output force from the constrained part of the PBA is not enacted in a direction away from the surface.

2. The object restraint system of claim 1, wherein the constrained part comprises: a range of the PBA from an insubstantial to a substantial part of the PBA, and the unconstrained part comprises: a range of the PBA from an insubstantial to a substantial part of the PBA.

3. The object restraint system of claim 2, further comprising:
    a set of chambers, each chamber comprising a cavity for compressing an amount of air wherein the amount of compressed air enables the cavity to exhibit a set of a plurality of output forces in both a perpendicular direction and a lateral direction from the cavity for enabling the constraint of the PBA.

4. The object restraint system of claim 3, further comprising:
    an inextensible layer extends a side of the PBA and is attached to only one side of each chamber of the set of chambers to enable the compressed air to flow to each chamber and to constrain only the one side of each chamber in response to output forces from the compressed air in each chamber while an opposite side not attached to the inextensible layer is not constrained and is responsive to forces of the compressed air in the chamber.

5. The object restraint system of claim 4, wherein the constrained part of the PBA is constrained in the trench by the output forces in the lateral direction from each chamber of the PBA within the trench whereby the output forces of each chamber push against a side of the trench.

6. The object restraint system of claim 5, further comprising:
    the curved segment of the unconstrained part of the PBA is configured by a set of lateral forces pushing against each side wall of each chamber and an expansion of each chamber in the opposite site not constrained thereby resulting in a curvature design of the curved segment by an expansion of only the single opposite side while the constrained side does not expand.

7. The object restraint system of claim 6, further comprising:
    a retaining lip configured within the trench to constrain the constrained part of the PBA in the trench to remain flat at the surface wherein the surface of the trench is defined by the retaining lip.

8. The object restraint system of claim 7, further comprising:
    a flare configuration for enabling further lateral expansion of each chamber of the PBA wherein the flare configuration is a split in the middle of each chamber to enable each side of the flare configuration to exert opposing forces for the lateral expansion.

9. The object restraint system of claim 8, further comprising:
    the side of the flare configuration constrained in the perpendicular direction by the lip to enable the constrained part of the PBA to remain flat.

10. The object restraint system of claim 9, further comprising:
an array configured by a plurality of PBAs to a set of configurations of PBAs comprising: rotational, reflectional, double reflectional and localized symmetry of the each set for grip a variety of objects of different sizes.

11. An apparatus for object restraint, the apparatus comprising:
a trench;
a pneumatic bending actuator (PBA), the PBA and the trench configured on a surface for enabling a clamping of the object to the surface;
a part of the PBA constrained in the trench and a part of the PBA left unconstrained by the trench wherein the constrained part is configured as flat on the surface and the unconstrained is configured as a curved segment protruding from the surface wherein the constrained and unconstrained part comprise: a substantial to an unsubstantial part of the PBA;
a primary actuation mechanism for constraining in the trench wherein the constrained part of the PBA remains flat at the surface for resting the object on the surface, and for leaving the unconstrained part configured as the curved segment to exert a clamping force to the object on the surface and for clamping the object to the surface; and
a secondary constraint mechanism to constrain the constrained part of the PBA in the trench to prevent constrained portions of the constrained part of the PBA from exerting an upward force counter to the clamping by the curved segment of the unconstrained part of the PBA on the object, and to ensure that an output force from the constrained part of the PBA is not enacted in a direction away from the surface.

12. The object restraint apparatus of claim 11, further comprising:
a set of chambers, each chamber comprising a cavity for compressing an amount of air wherein the amount of compressed air enables the cavity to exhibit a set of a plurality of output forces in both a perpendicular direction and a lateral direction from the cavity for enabling the constraint of the PBA.

13. The object restraint apparatus of claim 12, further comprising:
an inextensible layer extends a side of the PBA and is attached to only one side of each chamber of the set of chambers to enable the compressed air to flow to each chamber and to constrain only the one side of each chamber in response to output forces from the compressed air in each chamber while an opposite side not attached to the inextensible layer is not constrained and is responsive to forces of the compressed air in the chamber.

14. The object restraint apparatus of claim 13, wherein the constrained part of the PBA is constrained in the trench by the output forces in the lateral direction from each chamber of the PBA within the trench whereby the output forces of each chamber push against a side of the trench.

15. The object restraint apparatus of claim 14, further comprising:
the curved segment of the unconstrained part of the PBA is configured by a set of lateral forces pushing against each side wall of each chamber and an expansion of each chamber in the opposite site not constrained thereby resulting in a curvature design of the curved segment by an expansion of only the single opposite side while the constrained side does not expand.

16. The object restraint apparatus of claim 15, further comprising:
a retaining lip configured within the trench to constrain the constrained part of the PBA in the trench to remain flat at the surface wherein the surface of the trench is defined by the retaining lip; and
a flare configuration for enabling further lateral expansion of each chamber of the PBA wherein the flare configuration is a split in the middle of each chamber to enable each side of the flare configuration to exert opposing forces for the lateral expansion; wherein the side of the flare configuration constrained in the perpendicular direction by the lip to enable the constrained part of the PBA to remain flat; and
an array configured by a plurality of PBAs to a set of configurations of PBAs comprising: rotational, reflectional, double reflectional and localized symmetry of the each set for grip a variety of objects of different sizes.

17. A pneumatic pop-up actuator system comprising:
a plurality of pneumatic pop-up actuators to hold an object, each of the pneumatic pop-up actuators configured with a body and a side containing an internal cavity for storing compressed air wherein the body and side are responsive to forces of the compressed air in the cavity;
the side of the pneumatic pop-up actuator configured to enable constraint in a trench in a non-popped state when not deployed, and to enable non-constraint from the trench in a popped state when deployed whereby during deployment, the body of the pneumatic pop-up actuator extends from a surface and the side extends from the body in a manner limited by the object and for holding the object to the surface; and
an array comprising at least one pneumatic pop-up actuator deployed in a manner to surround the object on the surface and a pneumatic pop-up actuator not deployed when located in a manner beneath the object on the surface wherein the pneumatic pop-up actuator beneath the object is blocked from deployment by the object; and further constraint by weight of the object wherein the weight of the object acts as an additional constraint by applying a downward force to the pneumatic pop-up actuator in the trench.

18. The pneumatic pop-actuator system of claim 17, further comprising:
the non-popped up state wherein the pneumatic pop-up actuator remains flush with the surface of the trench; and
a lip configured in the trench to restrain, by the side, the pneumatic pop-up actuator in the non-popped up state in the trench.

19. The pneumatic pop-actuator system of claim 18, further comprising:
the pneumatic pop-up actuators configured in the array in a manner to hold or retain objects between a set of at least one pneumatic pop-up actuator positioned at an array location wherein the pneumatic pop-up actuator holds or retains the object by being placed in the popped-up state.

20. The pneumatic pop-up actuator system of claim 19, further comprising:
the array of pneumatic pop-up actuators that hold or retain an object by at least one pop-up pneumatic actuator whilst the object resides over the surface containing at least one pneumatic pop-up actuator in a non-popped state thereby the array can accommodate objects of a variety of sizes and shapes that do not conform directly to a layout of the pneumatic pop-up actuators contained in the array.

* * * * *